United States Patent
Kalarot et al.

(10) Patent No.: US 11,823,490 B2
(45) Date of Patent: Nov. 21, 2023

(54) NON-LINEAR LATENT TO LATENT MODEL FOR MULTI-ATTRIBUTE FACE EDITING

(71) Applicant: ADOBE INC., San Jose, CA (US)

(72) Inventors: Ratheesh Kalarot, San Jose, CA (US); Siavash Khodadadeh, Orlando, FL (US); Baldo Faieta, San Francisco, CA (US); Shabnam Ghadar, Menlo Park, CA (US); Saeid Motiian, San Francisco, CA (US); Wei-An Lin, San Jose, CA (US); Zhe Lin, Bellevue, WA (US)

(73) Assignee: ADOBE, INC., San Jose, CA (US)

( * ) Notice: Subject to any disclaimer, the term of this patent is extended or adjusted under 35 U.S.C. 154(b) by 373 days.

(21) Appl. No.: 17/341,778

(22) Filed: Jun. 8, 2021

(65) Prior Publication Data

US 2022/0391611 A1 Dec. 8, 2022

(51) Int. Cl.
*G06V 40/16* (2022.01)
*G06N 3/084* (2023.01)
(Continued)

(52) U.S. Cl.
CPC .......... *G06V 40/169* (2022.01); *G06N 3/045* (2023.01); *G06N 3/084* (2013.01); *G06T 11/60* (2013.01)

(58) Field of Classification Search
CPC .... G06V 40/169; G06V 10/82; G06V 40/172; G06V 40/168; G06V 10/764; G06V 10/454; G06V 10/774; G06V 10/25; G06V 20/46; G06V 10/44; G06N 3/045; G06N 3/084; G06N 3/0475; G06N 3/088; G06N 3/09; G06N 3/094; G06N 3/08; G06N 3/047; G06N 3/04; G06N 3/044; G06N 20/00; G06N 3/048; G06N 3/0464; G06T 11/60; G06T 11/00; G06T 2207/20084;
(Continued)

(56) References Cited

U.S. PATENT DOCUMENTS 9,519,858 B2 * 12/2016 Zweig ..................... G06F 40/44
10,282,864 B1 * 5/2019 Kim ....................... G06N 3/084
(Continued)

OTHER PUBLICATIONS

Abdal, et al., "StyleFlow: Attribute-conditioned Exploration of StyleGAN-Generated Images using Conditional Continuous Normalizing Flows", arXiv preprint arXiv:2008.02401v2 [cs.CV] Sep. 20, 2020, 22 pages.
(Continued)

*Primary Examiner* — Michael S Osinski
(74) *Attorney, Agent, or Firm* — CHAU & ASSOCIATES, LLC

(57) ABSTRACT

Systems and methods for image processing are described. One or more embodiments of the present disclosure identify a latent vector representing an image of a face, identify a target attribute vector representing a target attribute for the image, generate a modified latent vector using a mapping network that converts the latent vector and the target attribute vector into a hidden representation having fewer dimensions than the latent vector, wherein the modified latent vector is generated based on the hidden representation, and generate a modified image based on the modified latent vector, wherein the modified image represents the face with the target attribute.

20 Claims, 13 Drawing Sheets

(51) Int. Cl.
    *G06T 11/60*     (2006.01)
    *G06N 3/045*     (2023.01)

(58) Field of Classification Search
    CPC . G06T 2207/20081; G06T 2207/30201; G06T 5/50; G06F 40/30; G06F 18/2148; G06F 18/253; G06F 18/214
    See application file for complete search history.

(56) References Cited

U.S. PATENT DOCUMENTS

| | | | | |
|---|---|---|---|---|
| 11,580,395 | B2* | 2/2023 | Karras | G06N 3/08 |
| 11,586,841 | B2* | 2/2023 | Iyer | G06T 11/00 |
| 2016/0171346 | A1* | 6/2016 | Han | G06F 18/2413 382/156 |
| 2017/0083752 | A1* | 3/2017 | Saberian | G06V 10/764 |
| 2017/0193286 | A1* | 7/2017 | Zhou | G06V 40/172 |
| 2018/0032840 | A1* | 2/2018 | Yu | G06V 10/774 |
| 2019/0156144 | A1* | 5/2019 | Li | G06F 18/253 |
| 2019/0156248 | A1* | 5/2019 | Togashi | G06F 18/214 |
| 2019/0279075 | A1* | 9/2019 | Liu | G06N 3/045 |
| 2020/0151849 | A1* | 5/2020 | Liao | G06T 5/50 |
| 2020/0258197 | A1* | 8/2020 | Tai | G06T 3/4046 |
| 2020/0265495 | A1* | 8/2020 | Cho | G06V 10/82 |
| 2021/0034840 | A1* | 2/2021 | Fan | G06V 20/46 |
| 2021/0049468 | A1* | 2/2021 | Karras | G06V 40/168 |
| 2021/0209464 | A1* | 7/2021 | Bala | G06N 20/00 |
| 2021/0264234 | A1* | 8/2021 | Paris | G06N 3/045 |
| 2021/0397794 | A1* | 12/2021 | Chen | G06F 40/30 |
| 2022/0028139 | A1* | 1/2022 | Mitra | G06V 40/175 |
| 2022/0051479 | A1* | 2/2022 | Agarwal | G06N 3/045 |
| 2022/0067886 | A1* | 3/2022 | Bui | G06V 10/82 |
| 2022/0101032 | A1* | 3/2022 | Cho | G06V 10/422 |
| 2022/0121932 | A1* | 4/2022 | Kalarot | G06T 11/001 |
| 2022/0138897 | A1* | 5/2022 | Singh | G06T 7/73 382/159 |
| 2022/0198616 | A1* | 6/2022 | Lee | G06T 5/003 |
| 2022/0215655 | A1* | 7/2022 | Cao | G06V 40/172 |
| 2022/0245764 | A1* | 8/2022 | Zhang | G06N 3/045 |
| 2022/0327308 | A1* | 10/2022 | Song | G06N 3/045 |
| 2022/0392255 | A1* | 12/2022 | Moustafa | G06V 10/82 |
| 2022/0394337 | A1* | 12/2022 | Vagharshakian | G06Q 30/0201 |
| 2023/0009547 | A1* | 1/2023 | Yang | G06V 10/806 |
| 2023/0124252 | A1* | 4/2023 | Liu | G06T 11/001 345/589 |
| 2023/0154165 | A1* | 5/2023 | Park | G06V 10/82 382/128 |
| 2023/0162407 | A1* | 5/2023 | Kalarot | G06T 11/00 382/118 |
| 2023/0206515 | A1* | 6/2023 | Lee | G06V 10/82 345/619 |
| 2023/0206896 | A1* | 6/2023 | Kim | G10L 21/10 704/259 |

OTHER PUBLICATIONS

Bińkowski, et al., "Demystifying MMD GANS", arXiv preprint arXiv:1801.01401v5 [STAT.ML] Jan. 14, 2021, 36 pages.
Chen, et al., "Neural Ordinary Differential Equations", arXiv preprint arXiv:1806.07366v5 [cs.LG] Dec. 14, 2019, 18 pages.
Choi, et al., "StarGAN v2: Diverse Image Synthesis for Multiple Domains", In Proc. of the IEEE/CVF Conf. on Computer Vision and Pattern Recognition (CVPR), arXiv preprint arXiv:1912.01865v2 [cs.CV] Apr. 26, 2020, pp. 8188-8197.
Härkönen, et al., "GANSpace: Discovering Interpretable GAN Controls", 34th Conference on Neural Information Processing Systems (NeurIPS 2020), 10 pages.
Heusel, et al., "GANs Trained by a Two Time-Scale Update Rule Converge to a Local Nash Equilibrium", In Advances in neural information processing systems (NeurIPS), 31st Conference on Neural Information Processing Systems (NIPS 2017), pp. 6626-6637.
Hou, et al., "GuidedStyle: Attribute Knowledge Guided Style Manipulation for Semantic Face Editing", arXiv preprint arXiv:2012.11856,v1 [cs.CV] Dec. 22, 2020, 10 pages.
Isola, et al., "Image-to-Image Translation with Conditional Adversarial Networks", In Proc. of the IEEE Conf. on computer vision and pattern recognition (CVPR), pp. 1125-1134, 2017.
Jahanian, et al., "On the "steerability" of generative adversarial networks", arXiv preprint arXiv: 1907.07171v1 [cs.CV] Jul. 16, 2019, 25 pages.
Karras, et al., "Progressive Growing of Gans for Improved Quality, Stability, and Variation", arXiv preprint arXiv:1710.10196v3 [cs.NE] Feb. 26, 2018, 26 pages.
Karras, et al., "A Style-Based Generator Architecture for Generative Adversarial Networks", In Proc. of the IEEE/CVF Conf. on Computer Vision and Pattern Recognition (CVPR), arXiv preprint arXiv:1812.04948v3 [cs.NE] Mar. 29, 2019, pp. 4401-4410.
Karras, et al., "Analyzing and Improving the Image Quality of StyleGAN", In Proc. of the IEEE/CVF Conf. on Computer Vision and Pattern Recognition (CVPR), arXiv preprint arXiv: 1912.04958v2 [cs.CV] Mar. 23, 2020, pp. 8110-8119.
Lee, et al., "MaskGAN: Towards Diverse and Interactive Facial Image Manipulation", In IEEE Conf. on Computer Vision and Pattern Recognition (CVPR), pp. 5549-5558, 2020.
Microsoft Azure Face. 2021. https:// azure.microsoft.com/en-in/ services/ cognitive-services/face/. Online; accessed Jan. 19, 2021.
Mikolov, et al., "Efficient Estimation of Word Representations in Vector Space", arXiv preprint arXiv: 1301.3781v3 [cs.CL] Sep. 7, 2013, 12 pages.
Mirza, et al., "Conditional Generative Adversarial Nets", arXiv preprint arXiv:1411.1784v1 [cs.LG] Nov. 6, 2014, 7 pages.
Nitzan, et al., "Face Identity Disentanglement via Latent Space Mapping", ACM Transactions on Graphics (TOG), vol. 39, No. 6, Article 225, arXiv preprint arXiv:2005.07728v3 [cs.CV] Oct. 19, 2020, 23 pages.
Park, et al., "Swapping Autoencoder for Deep Image Manipulation", arXiv preprint arXiv:2007.00653v2 [cs.CV] Dec. 14, 2020, 23 pages.
Radford, et al., "Unsupervised Representation Learning With Deep Convolutional Generative Adversarial Networks", arXiv preprint arXiv:1511.06434v2 [cs.LG] Jan. 7, 2016, 16 pages.
Salimans, et al., "Improved Techniques for Training GANs", 30th Conference on Neural Information Processing Systems (NIPS 2016), Advances in neural information processing systems (NeurIPS), pp. 4844-4852.
Schroff, et al., "FaceNet: A Unified Embedding for Face Recognition and Clustering", In Proc. of the IEEE Conf. on computer vision and pattern recognition (CVPR), pp. 815-823, 2015.
Shen, et al., "InterFaceGAN: Interpreting the Disentangled Face Representation Learned by GANs", IEEE Transactions on Pattern Analysis and Machine Intelligence (TPAMI), arXiv preprint arXiv:2005.09635v2 [cs.CV] Oct. 29, 2020, 16 pages.
Tewari, et al., "StyleRig: Rigging StyleGAN for 3D Control over Portrait Images", In Proc. of the IEEE/CVF Conf. on Computer Vision and Pattern Recognition (CVPR), pp. 6142-6151, 2020.
Wu, et al., "StyleSpace Analysis: Disentangled Controls for StyleGAN Image Generation", arXiv preprint arXiv:2011.12799v2 [cs.CV] Dec. 3, 2020, 25 pages.
Xia, et al., "GAN Inversion: A Survey", arXiv preprint arXiv:2101.05278v2 [cs.CV] Mar. 8, 2021, 22 pages.
Zhang, et al., "Joint Face Detection and Alignment using Multi-task Cascaded Convolutional Networks", IEEE Signal Processing Letters, 2016, 5 pages.
Zhu, et al., "Unpaired Image-to-Image Translation using Cycle-Consistent Adversarial Networks", In Proc. of the IEEE Int'l Conf. on computer vision (ICCV), pp. 2223-2232, 2017.

* cited by examiner

NON-LINEAR LATENT TO LATENT MODEL FOR MULTI-ATTRIBUTE FACE EDITING

BACKGROUND

The following relates generally to image processing, and more specifically to editing image attributes.

Digital image processing refers to the use of a computer to edit a digital image using an algorithm or a processing network. In some examples, an image may be processed using image editing software. One common use for image editing software is to edit images of people, such as photographs of people taken using a mobile electronic device. With the wide availability of cameras in smart phones and other mobile electronic devices, many people capture and edit such photographs.

Attribute-based editing is a sub-task of image processing. Attribute-based image editing systems generate a new image based on an original image (e.g., an image of a face). One or more attributes relevant to the face are changed following user request. In some cases, these conventional editing systems have used machine learning models to compute high-dimensional feature vectors for image editing.

However, conventional image editing systems are not able to retain personal identity and the person in the edited image is no longer recognizable. Therefore, there is a need in the art for improved image processing systems to automatically change attributes of an image while maintaining faithful representation of the person in the original image.

SUMMARY

The present disclosure describes systems and methods for image processing. Some embodiments of the disclosure include an image processing apparatus configured to generate a modified latent vector and further generate a modified image based on the modified latent vector. For example, a machine learning model (i.e., a latent-to-latent mapping network) is trained based on a multi-task loss function for attribute modification and face identity preservation. In some embodiments, the trained network is configured to generate a modified latent vector based on a latent vector representing an image of a face and a target attribute vector. In some examples, the mapping network converts the latent vector and the target attribute vector into a hidden representation having fewer dimensions than the latent vector.

A method, apparatus, and non-transitory computer readable medium for image processing are described. One or more embodiments of the method, apparatus, and non-transitory computer readable medium include identifying a latent vector representing an image of a face, identifying a target attribute vector representing a target attribute for the image, generating a modified latent vector using a mapping network that converts the latent vector and the target attribute vector into a hidden representation having fewer dimensions than the latent vector, wherein the modified latent vector is generated based on the hidden representation, and generating a modified image based on the modified latent vector, wherein the modified image represents the face with the target attribute.

An apparatus and method for image processing are described. One or more embodiments of the apparatus and method include a target attribute component configured to generate a target attribute vector indicating a target attribute for an image of a face, a mapping network configured to convert a latent vector representing the image and the target attribute vector indicating the target attribute for the face into a hidden representation having fewer dimensions than the latent vector, and to generate a modified latent vector based on the hidden representation, and a generator network configured to generate a modified image based on the modified latent vector, wherein the modified image represents the face with the target attribute.

A method, apparatus, and non-transitory computer readable medium for training a neural network are described. One or more embodiments of the method, apparatus, and non-transitory computer readable medium include identifying a training set comprising an image of a face, a latent vector representing the image, and a target attribute vector representing a target attribute for the face, computing a modified latent vector based on the latent vector and the target attribute vector by performing a non-linear transformation of the latent vector using a mapping network, generating a modified image based on the modified latent vector, wherein the modified image represents the face with the target attribute, generating a modified target attribute vector based on the modified image, computing a target attribute loss by comparing the target attribute vector with the modified target attribute vector, and training the mapping network based on the target attribute loss.

DETAILED DESCRIPTION

Figure 1:
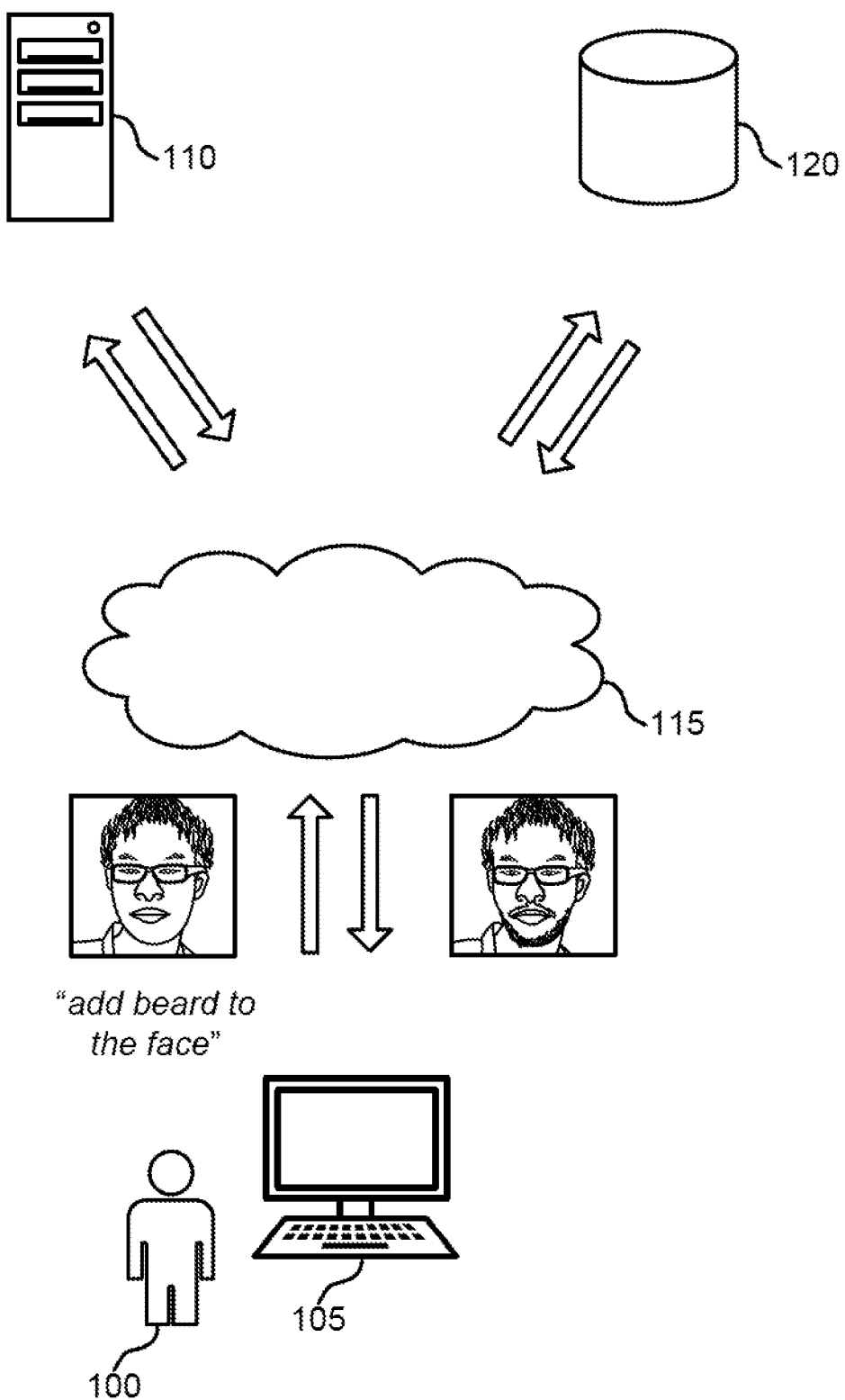
FIG. 1 shows an example of an image processing system according to aspects of the present disclosure.

The present disclosure describes systems and methods for image processing. Some embodiments of the disclosure include an image processing apparatus configured to generate a modified latent vector (and subsequently, a modified image) based a target attribute vector and a latent vector representing a face. For example, a machine learning model (i.e., a latent-to-latent mapping network) may be trained based on multi-task loss function to match a target attribute while preserving face identity. In some embodiments, the mapping network converts the latent vector and a target attribute vector into a hidden representation having fewer dimensions than the latent vector (i.e., at a bottleneck layer).

Computer graphics systems are used to generate realistic images that can be controlled using user-specified attributes. One approach is to create detailed 3D models, decorate them with custom materials and texture properties, and render them using realistic camera and illumination models. Such an approach provides users with significant control over a range of attributes such as object properties, camera position, and illumination. However, these conventional methods have difficulty in achieving photorealism over a range of attribute specifications.

Therefore neural networks, such as generative adversarial networks (GANs), have been developed that can generate realistic images of faces and other objects. In some cases, a GAN includes a mapping network for generating a feature vector, and a generator network for transforming the feature vector into an image. Changing the feature vector can result in changes to attributes of the image. For example, each attribute change can be associated with a vector transformation that takes one feature vector to another. However, since GANs encode image attributes in a complex way, changing the feature vector can result in inadvertent changes to other attributes of the image.

For example, if a user intends changes exclusively to one attribute (e.g., increasing age to make the face look older), other attributes relevant to the image (e.g., skin color, hair color, or facial structure, or even the presence of eyeglasses, gender) can be changed such that the modified image is no longer a faithful representation of the identity of the original image. These changes occur due to the way features of the image are encoded. Specifically, visible features such as facial expression, age, and gender are encoded in a complex, interdependent way that is different for every image. Thus, changing one feature can change the essential identity of the image and render the modified image unsuitable for the intended use.

Embodiments of the present disclosure provide a neural network trained to retain the personal identity of a person in an original image. Therefore, embodiments of the present disclosure enable user-specified changes to one or more attributes of the face that do not lead to unwanted changes to other attributes. A latent-to-latent mapping network can process a relatively large number of facial attributes simultaneously. In some embodiments, the mapping network converts a latent vector and a target attribute vector into a hidden representation having fewer dimensions than the latent vector (either the input or the output) at a bottleneck layer. The trained mapping network is compatible with a variety of different GAN generators and a modified image can subsequently be generated based on user-specified changes to multiple attributes efficiently.

Some embodiments of the present disclosure include an image processing apparatus that can automatically modify an original image of a face based on user-specified changes to one or more attributes. The latent-to-latent mapping network may be integrated into a larger network architecture which includes a generator network and an attribute regression network. In some examples, the mapping network includes a fully connected neural network. A multi-task loss function may be used to train the mapping network to preserve personal identity of a face. In some examples, mutual information or a correlation relationship between a set of attributes are used to correct one or more target attribute vectors before feeding the vectors into the mapping network.

Embodiments of the present disclosure may be used in the context of image editing application. For example, an image processing network based on the present disclosure may be used to modify an image of a face based on user request to change one or more attributes. A user can input natural language command or set new values for one or more attributes relevant to the face on an image editing application. An example application in the image editing context is provided with reference to FIGS. 1, 2 and 3. Details regarding the architecture of an example image processing apparatus are provided with reference to FIGS. 4 and 5. Examples of a process for training an image processing network are provided with reference to FIGS. 9 to 13.

Image Processing System

FIG. 1 shows an example of an image processing system according to aspects of the present disclosure. The example shown includes user 100, user device 105, image processing apparatus 110, cloud 115, and database 120.

In the example of FIG. 1, the user 100 provides a user request indicating changes to one or more target attributes. Such a user request is fed to image processing apparatus 110, e.g., using a user device 105 communicating via the cloud 115. Image processing apparatus 110 may access to images information stored in a database 120.

In some embodiments, image processing apparatus 110 identifies a latent vector representing an image having a human face. Image processing apparatus 110 identifies a target attribute vector representing a target attribute (e.g., beard, facial hair) for the image. In the example above, the target attribute is a beard or facial hair. The user request is to add a beard to the face. Image processing apparatus 110 is trained to generate a modified latent vector representing the image using a mapping network. The mapping network converts the latent vector and the target attribute vector into a hidden representation, and then outputs a modified latent vector. In some cases, the latent vector may be referred to as a feature vector.

Image processing apparatus 110 generates the modified latent vector based on the hidden representation, and the generator network of image processing apparatus 110 is used to generate a modified image based on the modified latent vector. The modified image represents the face with the target attribute. As shown in FIG. 1, the output image includes beard added to the face per user request.

The user device 105 may be a personal computer, laptop computer, mainframe computer, palmtop computer, personal assistant, mobile device, or any other suitable processing apparatus. In some examples, the user device 105 includes software that incorporates an image editing application (e.g., an image processing system). The image editing application may either include or communicate with the image processing apparatus 110.

Image processing apparatus 110 includes a computer implemented network including a target attribute component, a mapping network, a generator network, and an attribute regression network. The network identifies a latent vector representing an image of a face. The network identifies a target attribute vector representing a target attribute for the image. The network generates a modified latent vector using a mapping network that converts the latent vector and the target attribute vector into a hidden representation having fewer dimensions than the latent vector.

The modified latent vector is generated based on the hidden representation, and the network generates a modified image based on the modified latent vector, where the modified image represents the face with the target attribute.

The term latent vector refers to an intermediate representation encoding image features in a vector space. For example, a latent vector may be a high-dimensional representation of an image of a face. In some cases, a target attribute is a desired attribute or feature such as a facial characteristic. Target attributes may correspond to facial features such as nose size, eye color, or hair color. In some examples, attributes such as age or gender are not necessarily facial features. In some cases, a vector representation of a target attribute may be referred to as a target attribute vector. A target attribute vector represents one or more target attributes (e.g., hair color, age) for an image of a face. A hidden representation is a vector representation generated by a hidden level of a neural network. According to some embodiments, the hidden representation at a bottleneck layer of a neural network has fewer dimensions than the input latent vector.

Image processing apparatus 110 may also include a processor unit and a memory unit. Additionally, image processing apparatus 110 can communicate with the database 120 via the cloud 115. In some cases, the architecture of the image processing network is also referred to as a network model or a network. Further detail regarding the architecture of image processing apparatus 110 is provided with reference to FIGS. 4-6. Further detail regarding a process for image processing is provided with reference to FIGS. 7-8. Further detail regarding the training of image processing apparatus 110 is provided with reference to FIGS. 9-13.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A cloud 115 is a computer network configured to provide on-demand availability of computer system resources, such as data storage and computing power. In some examples, the cloud 115 provides resources without active management by the user. The term cloud 115 is sometimes used to describe data centers available to many users over the Internet. Some large cloud networks have functions distributed over multiple locations from central servers. A server is designated an edge server if it has a direct or close connection to a user. In some cases, a cloud 115 is limited to a single organization. In other examples, the cloud is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction.

Figure 2:
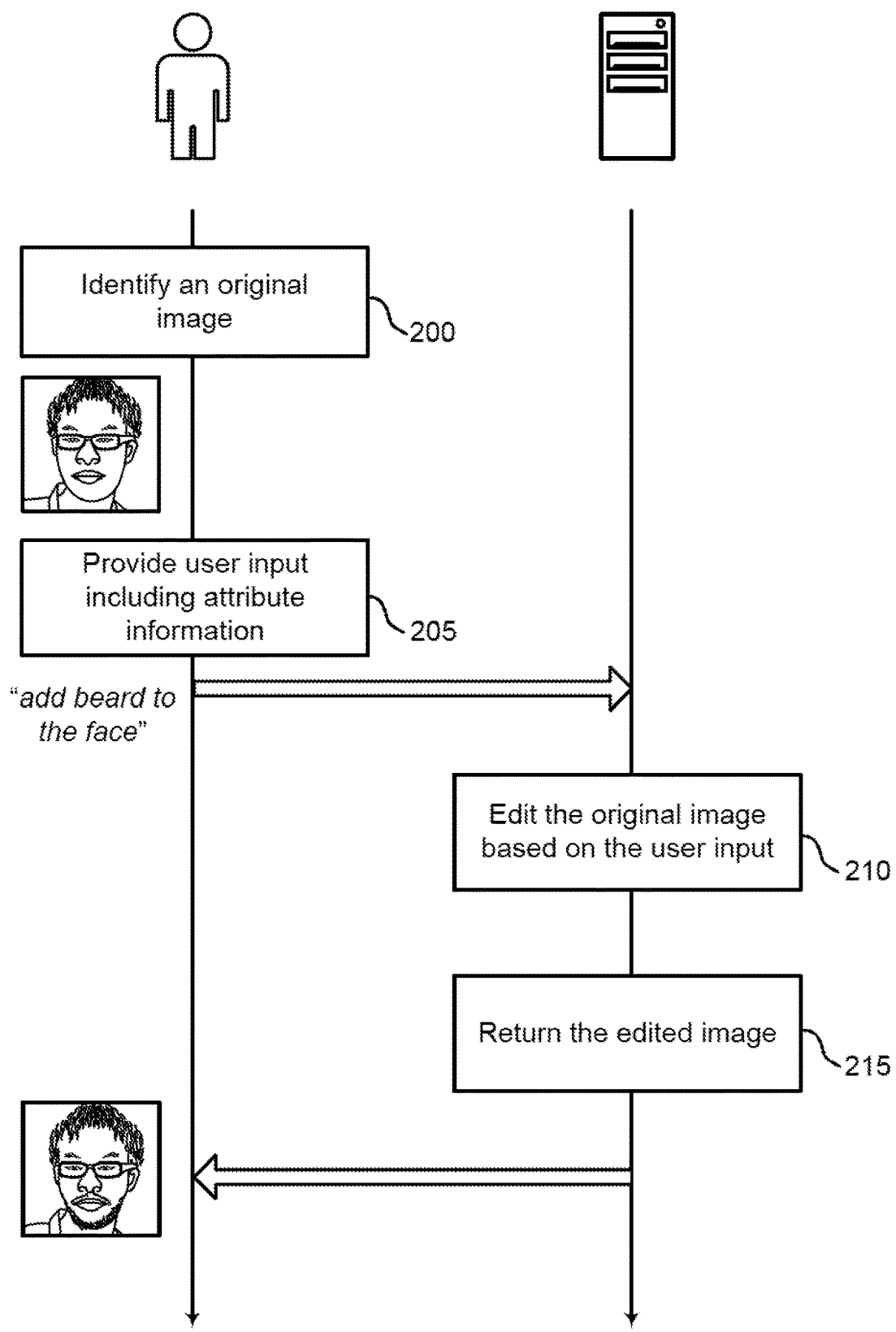
FIG. 2 shows an example of a face editing process according to aspects of the present disclosure.

FIG. 2 shows an example of a face editing process according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, the system identifies an original image. In some cases, the operations of this step refer to, or may be performed by, a user interface implemented on a user device as described with reference to FIG. 1. The original image is provided by a user using the user interface. The original image is input to the system (e.g., an image processing apparatus). In some cases, the original image is stored in a database and the system can access the database via a cloud. As an example, the original image includes a human face.

At operation 205, the system provides user input including attribute information. In some cases, the operations of this step refer to, or may be performed by, a user interface implemented on a user device as described with reference to FIG. 1. According to the example in FIG. 2, the user input or user request is "add beard to the face", a natural language input. In some cases, the user can adjust slide bars associated with each of the attributes using an image editing application. In this example, the user can level up the slide bar or adjust values corresponding to the target attribute "beard".

At operation 210, the system edits the original image based on the user input. In some cases, the operations of this step refer to, or may be performed by, an image processing apparatus as described with reference to FIG. 1. The image processing apparatus (see FIG. 1) edits the original image using an image processing network. The image editing application may either include or communicate with the image processing apparatus.

At operation 215, the system returns the edited image. In some cases, the operations of this step refer to, or may be performed by, an image processing apparatus as described with reference to FIG. 1. The system returns the edited image to the user via the user interface implemented on the user device. The user views the edited image and can then determine whether he or she wants to make additional changes to the image. The user can adjust slide bars associated with each of the attributes using the image editing application or enter new values corresponding to one or more target attributes.

Figure 3:
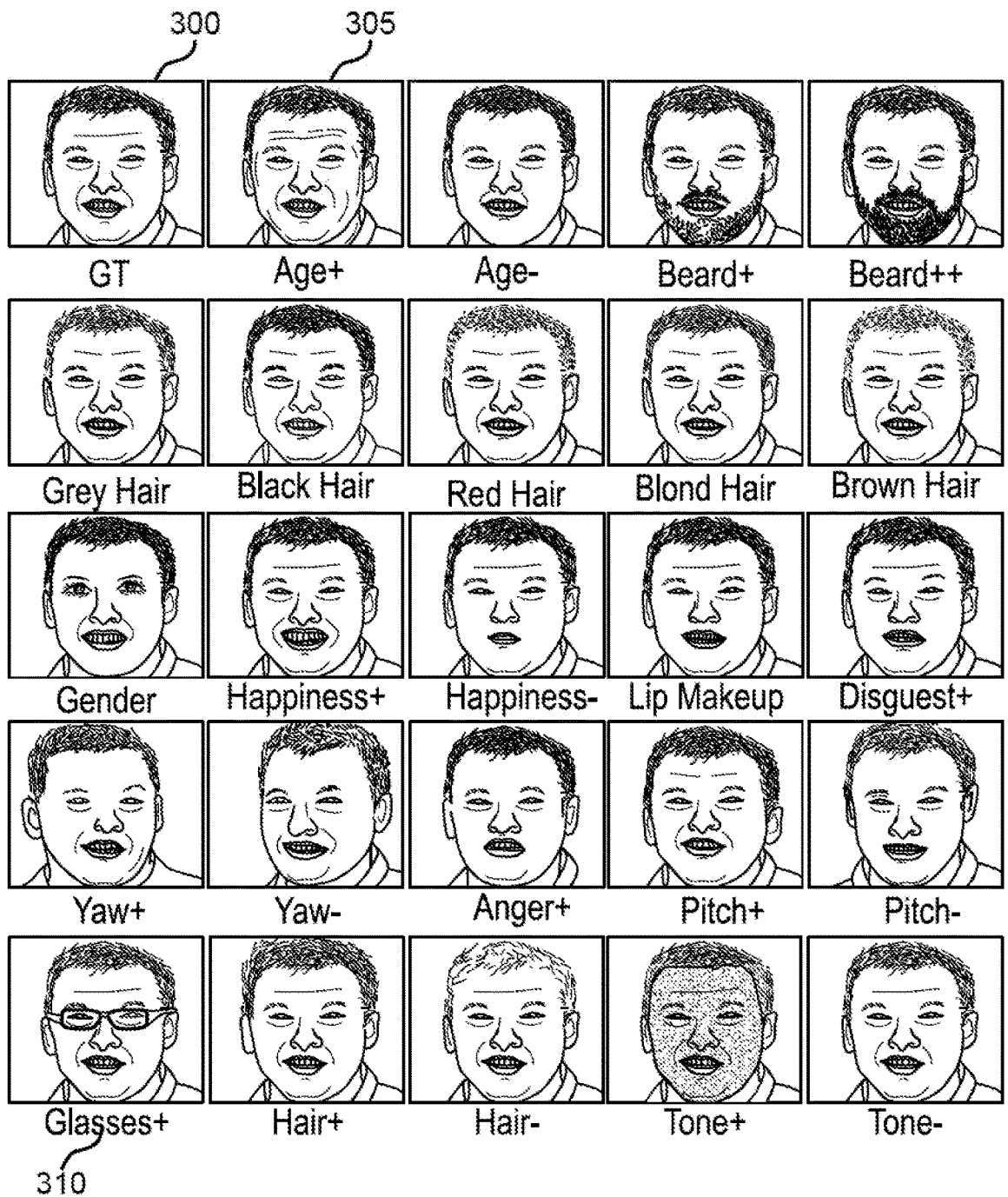
FIG. 3 shows an example of face editing based on user input indicating a target attribute according to aspects of the present disclosure.

FIG. 3 shows an example of face editing based on user input indicating a target attribute according to aspects of the present disclosure. The example shown includes original image 300, modified image 305, and target attribute 310. Original image 300 includes a human face having a set of attributes that can be further modified. The modified image 305 is generated based on the original image 300 incorporating target attribute 310 and/or changes made to a target attribute 310 based on user-specified request. Target attribute 310 may come from user request. In some examples, target attribute 310 involves adding eyeglasses (glasses+) to a face, making the face look older (age+), or making the face look younger (age−). Target attribute 310 can include age, beard, hair color, gender, etc.

In some examples, an image of a human face I is generated using a StyleGAN-type generator $\mathcal{G}$ from a latent vector w. In some cases, w is identified through generator network inversion (e.g., GAN inversion). Additionally, a set of attributes is associated with the image, $a=\{a_1, a_2, \ldots, a_N\}$. Each of these attributes $a_i$ takes a value from the interval [0, 1] and represent properties such as gender, age, hair, facial hair, presence of eyeglasses or pose which are interpretable by humans. A user, when given an image (e.g., leftmost image on the first row in FIG. 3), should be able to fill in the corresponding values of a. These attributes are used to describe a face. The user is able to modify values of a to produce a target attribute vector indicating changes to one or more target attributes (e.g., age+, age−, beard+).

Network Architecture

Figure 4:
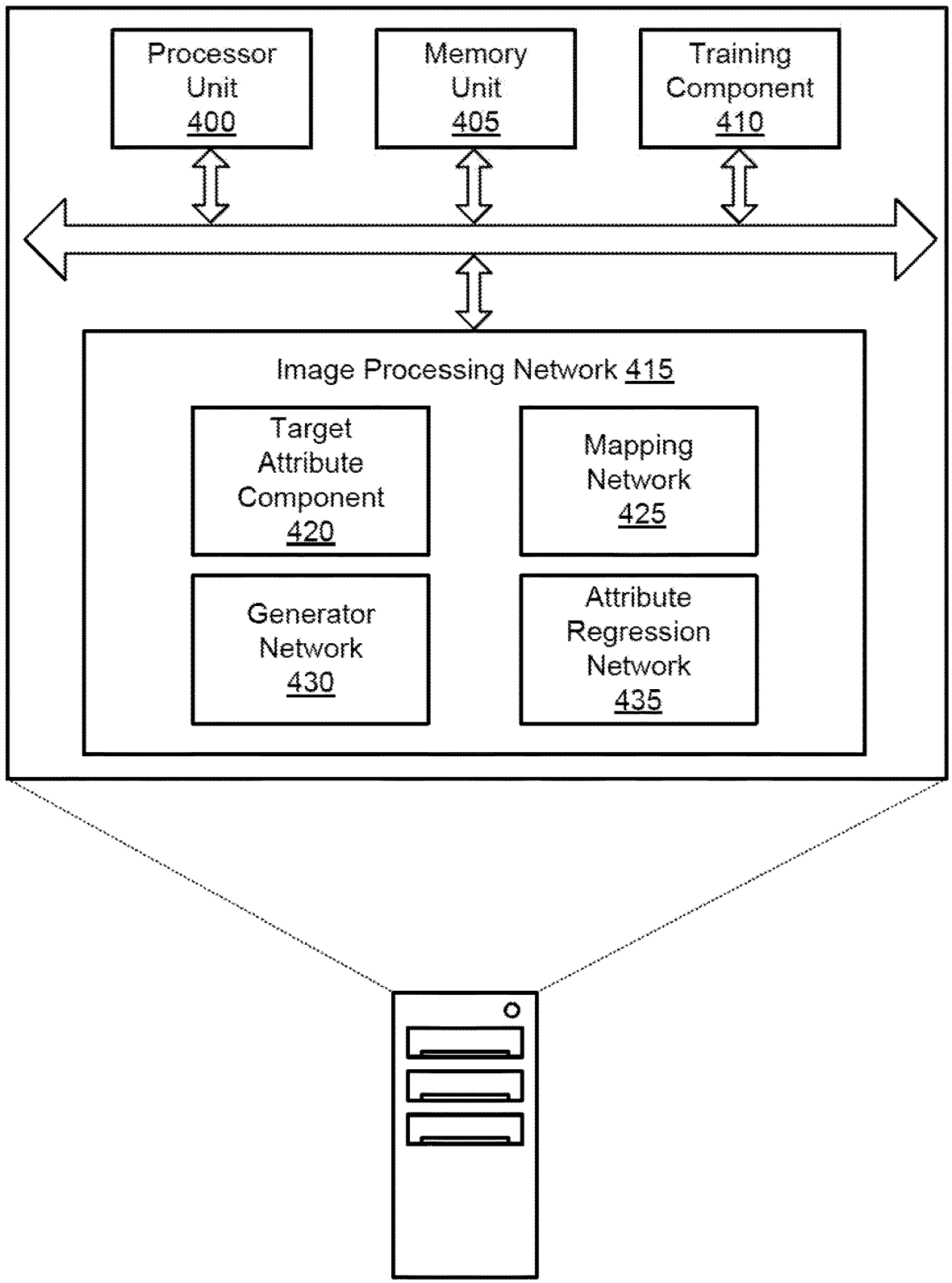
FIG. 4 shows an example of an image processing apparatus according to aspects of the present disclosure.
Figure 5:
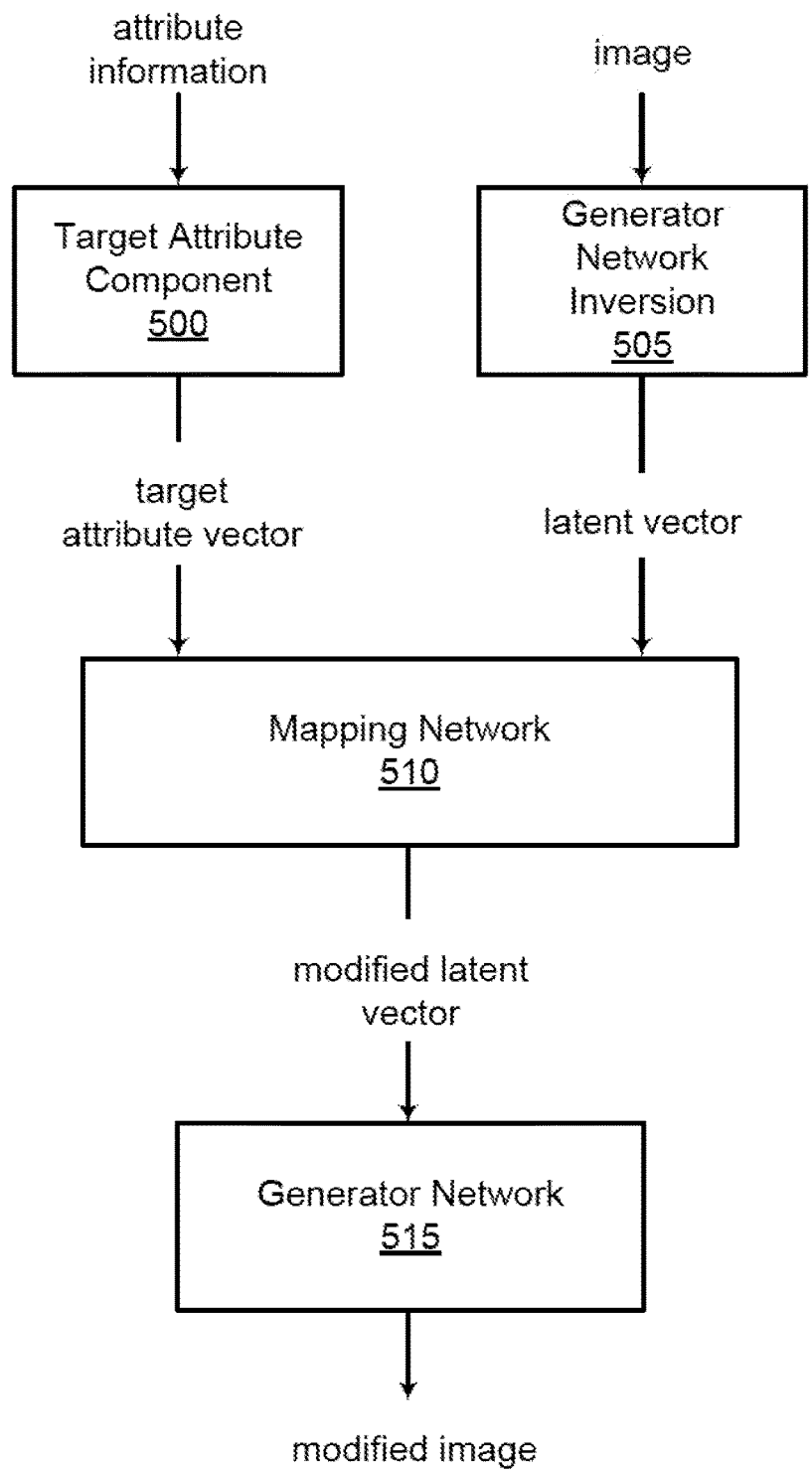
FIG. 5 shows an example of an image processing network according to aspects of the present disclosure.
Figure 6:
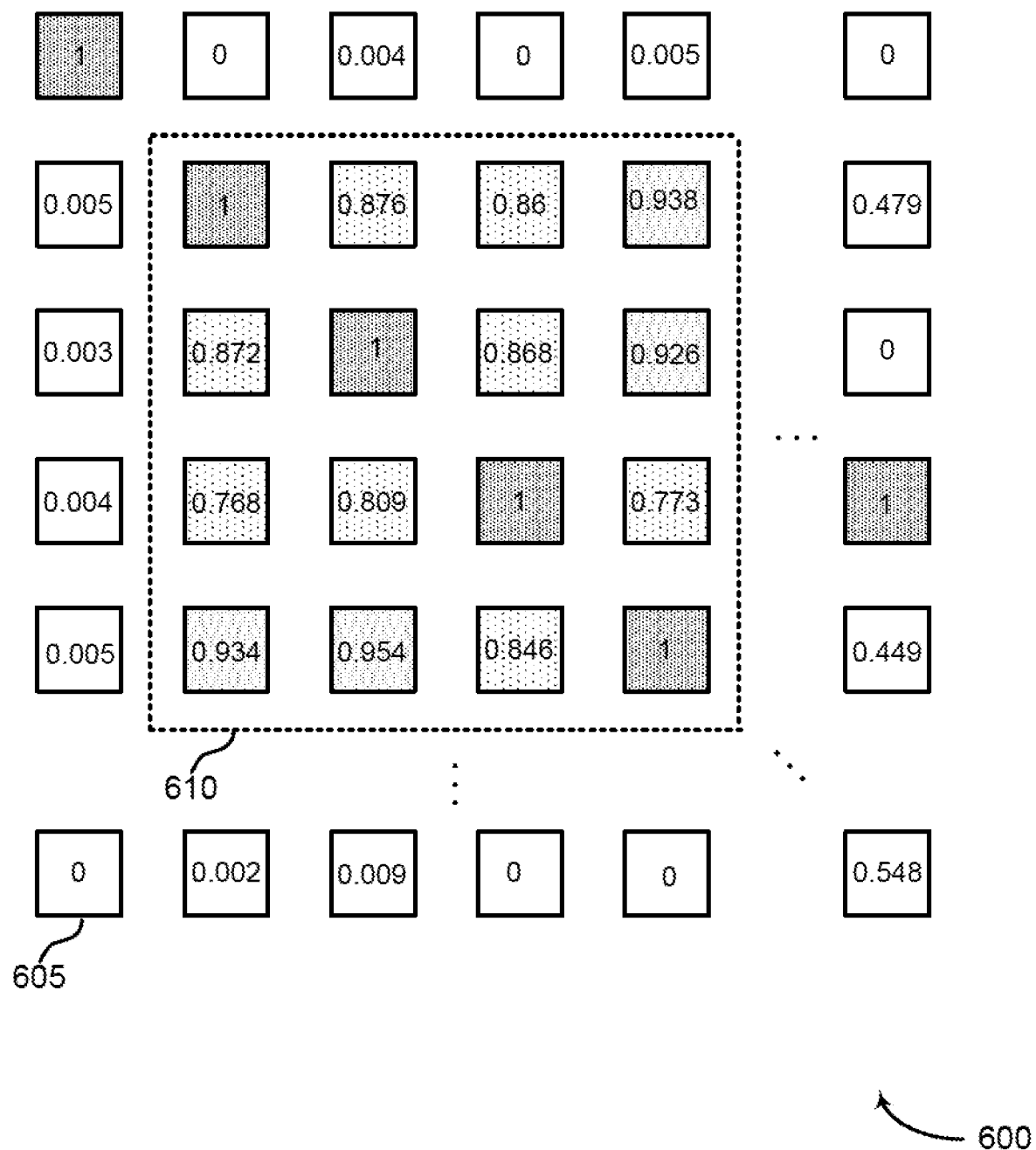
FIG. 6 shows an example of a mutual information matrix between attributes according to aspects of the present disclosure.

In FIGS. 4-6, an apparatus and method for image processing are described. One or more embodiments of the apparatus and method include a target attribute component configured to generate a target attribute vector indicating a target attribute for an image of a face, a mapping network configured to convert a latent vector representing the image and the target attribute vector indicating the target attribute for the face into a hidden representation having fewer dimensions than the latent vector, and to generate a modified latent vector based on the hidden representation, and a generator network configured to generate a modified image based on the modified latent vector, wherein the modified image represents the face with the target attribute.

In some examples, the mapping network comprises an input layer, an output layer, and a hidden layer, wherein the hidden layer has fewer dimensions than the input layer and fewer dimensions than the output layer.

Some examples of the apparatus and method described above further include an attribute regression network configured to generate a modified target attribute vector based on the modified image.

In some examples, the attribute regression network comprises a residual neural network, a convolution layer, and one or more fully connected layers. In some examples, the target attribute vector is produced using an inversion of the generator network. In some examples, the generator network comprises a generative adversarial network (GAN).

Some examples of the apparatus and method described above further include a facial recognition network configured to extract facial recognition features of the modified image.

FIG. 4 shows an example of an image processing apparatus according to aspects of the present disclosure. The example shown includes processor unit 400, memory unit 405, training component 410, and image processing network 415.

A processor unit 400 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 400 is configured to operate a memory array using a memory controller. In other cases, a memory controller is integrated into the processor. In some cases, the processor unit 400 is configured to execute computer-readable instructions stored in a memory to perform various functions. In some embodiments, a processor unit 400 includes special purpose components for modem processing, baseband processing, digital signal processing, or transmission processing.

Examples of a memory unit 405 include random access memory (RAM), read-only memory (ROM), or a hard disk. Examples of memory unit 405 include solid state memory and a hard disk drive. In some examples, a memory unit 405 is used to store computer-readable, computer-executable software including instructions that, when executed, cause a processor to perform various functions described herein. In some cases, the memory unit 405 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 405 store information in the form of a logical state.

According to some embodiments of the present disclosure, the image processing apparatus includes a computer implemented artificial neural network (ANN) that generates a modified image using a latent-to-latent mapping network based on user-specified changes to one or more attributes of an image. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, training component 410 identifies a training set including an image of a face, a latent vector representing the image, and a target attribute vector representing a target attribute for the face. In some examples, training component 410 computes a target attribute loss by comparing the target attribute vector with the modified target attribute vector. Training component 410 then trains the mapping network 425 based on the target attribute loss. In some examples, training component 410 identifies an original attribute vector for the image. Subsequently, training component 410 computes a cycle loss by comparing the cycle latent vector with the latent vector, where the mapping network 425 is trained based on the cycle loss. In some examples, training component 410 identifies an original attribute vector for the image. Subsequently, training component 410 computes an identity loss by comparing the identity latent vector with the latent vector, where the mapping network 425 is trained based on the identity loss. In some examples, training component 410 computes a neighborhood loss by comparing the modified latent vector with the latent vector, where the mapping network 425 is trained based on the neighborhood loss. In some examples, training component 410 computes a face identity loss by comparing the facial recognition features with the modified facial recognition features, where the mapping network 425 is trained based on the face identity loss.

According to some embodiments, image processing network 415 identifies a latent vector representing an image of a face. In some examples, image processing network 415 generates an original attribute vector representing attributes of the face. In some examples, image processing network 415 generates a low-resolution image by down-scaling the image, where the original attribute vector is generated based on the low-resolution image. In one embodiment, image processing network 415 includes target attribute component 420, mapping network 425, generator network 430, and attribute regression network 435. In some embodiments, target attribute component 420, mapping network 425, generator network 430, attribute regression network 435, and training component 410 may be implemented either as hardware components or as software components stored in the memory unit 405 and executed on the processor unit 400.

According to some embodiments, target attribute component 420 identifies a target attribute vector representing a target attribute for the image. In some examples, target attribute component 420 generates the target attribute vector based on the user input. In some examples, target attribute component 420 generates the target attribute vector by modifying the original attribute vector to represent the target attribute. In some examples, target attribute component 420 generates the target attribute vector based on the attribute information.

According to some embodiments, target attribute component 420 is configured to generate a target attribute vector indicating a target attribute for an image of a face. Target attribute component 420 computes mutual information between attributes of the target attribute vector. In some examples, target attribute component 420 computes a regulated attribute vector based on the target attribute vector and the mutual information, where the modified latent vector is generated based on the regulated attribute vector. Target attribute component 420 is an example of, or includes aspects of, the corresponding element described with reference to FIG. 5.

According to some embodiments, mapping network 425 generates a modified latent vector, where mapping network 425 converts the latent vector and the target attribute vector into a hidden representation having fewer dimensions than the latent vector. The modified latent vector is generated based on the hidden representation.

According to some embodiments, mapping network 425 is configured to convert a latent vector representing the image and the target attribute vector indicating the target attribute for the face into a hidden representation having fewer dimensions than the latent vector, and to generate a modified latent vector based on the hidden representation. In some examples, the mapping network 425 includes an input layer, an output layer, and a hidden layer, where the hidden layer has fewer dimensions than the input layer and fewer dimensions than the output layer.

According to some embodiments, mapping network 425 computes a modified latent vector based on the latent vector and the target attribute vector by performing a non-linear transformation of the latent vector. In some examples, mapping network 425 computes a cycle latent vector based on the modified latent vector and the original attribute vector. In some examples, mapping network 425 computes an identity latent vector based on the latent vector and the original attribute vector. Mapping network 425 is an example of, or includes aspects of, the corresponding element described with reference to FIGS. 5 and 9.

According to some embodiments, generator network 430 generates a modified image based on the modified latent vector, where the modified image represents the face with the target attribute. In some examples, the latent vector is generated using a generator network inversion. In some examples, the image is generated based on the latent vector. In some examples, the target attribute vector is produced using an inversion of the generator network 430. In some examples, the generator network 430 includes a GAN. Generator network 430 is an example of, or includes aspects of, the corresponding element described with reference to FIGS. 5 and 9.

According to some embodiments, attribute regression network 435 is configured to generate a modified target attribute vector based on the modified image. In some examples, the attribute regression network 435 includes a residual neural network, a convolution layer, and one or more fully connected layers. According to some embodiments, attribute regression network 435 generates a modified target attribute vector based on the modified image. Attribute regression network 435 is an example of, or includes aspects of, the corresponding element described with reference to FIG. 9.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 5 shows an example of an image processing network according to aspects of the present disclosure. The example shown includes target attribute component 500, generator network inversion 505, mapping network 510, and generator network 515.

From top to bottom of FIG. 5, attribute information is input to target attribute component 500, which produces a target attribute vector. An image is input to generator network inversion 505 to produce a latent vector. In some examples, an image of a human face I is generated by a StyleGAN-type generator $\mathcal{G}$ from a latent vector w from latent space $W_P$. w may be identified through a GAN inversion process based on a real-world image. In an embodiment, a collection of attributes is associated with the image, $a=\{a_1, a_2, \ldots, a_N\}$. Each attribute $a_i$ takes a value from the interval [0, 1] and the collection of attributes represent properties such as gender, age, hair, facial hair, presence of eyeglasses or pose. A user, when given an image I, is able to fill in the corresponding values of a. The set of attributes correspond to natural language concepts humans use when describing a face.

Target attribute component 500 is an example of, or includes aspects of, the corresponding element described with reference to FIG. 4. In some examples, a user can input or modify existing attribute information through an image processing application installed in a user device. Target attribute component 500 is implemented as a part of the image processing application.

In an embodiment, an image I with attribute vector a and the corresponding latent vector w is given. The user can specify a different attribute vector a', in response to which a corresponding image I' is generated such that image I' captures the attribute information (i.e., target attribute vector). An attribute edit based on user input is: $\Delta a=a'-a$.

Subsequently, the target attribute vector and the latent vector are input to mapping network 510, which produces a modified latent vector. Mapping network 510 is an example of, or includes aspects of, the corresponding element described with reference to FIGS. 4 and 9.

The latent-to-latent mapping network $f$ is embedded into an image processing network. The image processing network includes a generator network 515, which generates a new image (i.e., a modified image) based on attribute change request. The modified image captures attribute information or attribute changes from the user or based on user input to the image processing application. Generator network 515 is an example of, or includes aspects of, the corresponding element described with reference to FIGS. 4 and 9.

FIG. 6 shows an example of a mutual information matrix 600 between attributes according to aspects of the present disclosure. The example shown includes mutual information matrix 600, correlation score 605, and correlated attributes 610.

In some embodiments, the image processing network corrects a target attribute by adding a correction term obtained from the mutual information matrix 600 to produce a corrected attribute vector. The input of the latent-to-latent network is the attribute modification (i.e., $\Delta a=a'_c-a$).

The mutual information matrix 600 is used to measure a degree of correlation between attributes. In some examples, the clusters of correlated attributes include: (beard, moustache, facial hair, sideburns), (no glasses, glasses, readingglasses), and (hair invisible, gray hair, blond hair, brown hair, red hair, black hair). Embodiments of the present disclosure are not limited to the above-mentioned clusters of correlated attributes. As illustrated in FIG. 6, correlation score 605 is computed to measure correlation between correlated attributes 610. For example, attribute "age" is 100% correlated to itself ("age"). Therefore, a correlation score is set to 1. Most values on the diagonal line are set to one because an attribute is 100% correlated to itself. In one example, correlated attributes 610 include beard, moustache, facial hair, and sideburns as circled using the dashed line. Hair-related attributes are related to each other, the image processing network may not change them independently. Different filling patterns are used to demonstrate the degree of correlation between the correlated attributes 610. A first filling pattern is used to demonstrate correlation score ranging from 0.7 to 0.8. A second filling pattern is used to demonstrate correlation score ranging from 0.8 to 0.9. A third filling pattern is used to demonstrate correlation score ranging from 0.9 to 1. In this example (i.e., correlated attributes 610 as circled by the dashed line), correlation score 605 ranges from 0.768 to 0.954.

Editing Attributes Using an Image Processing Network

Figure 7:
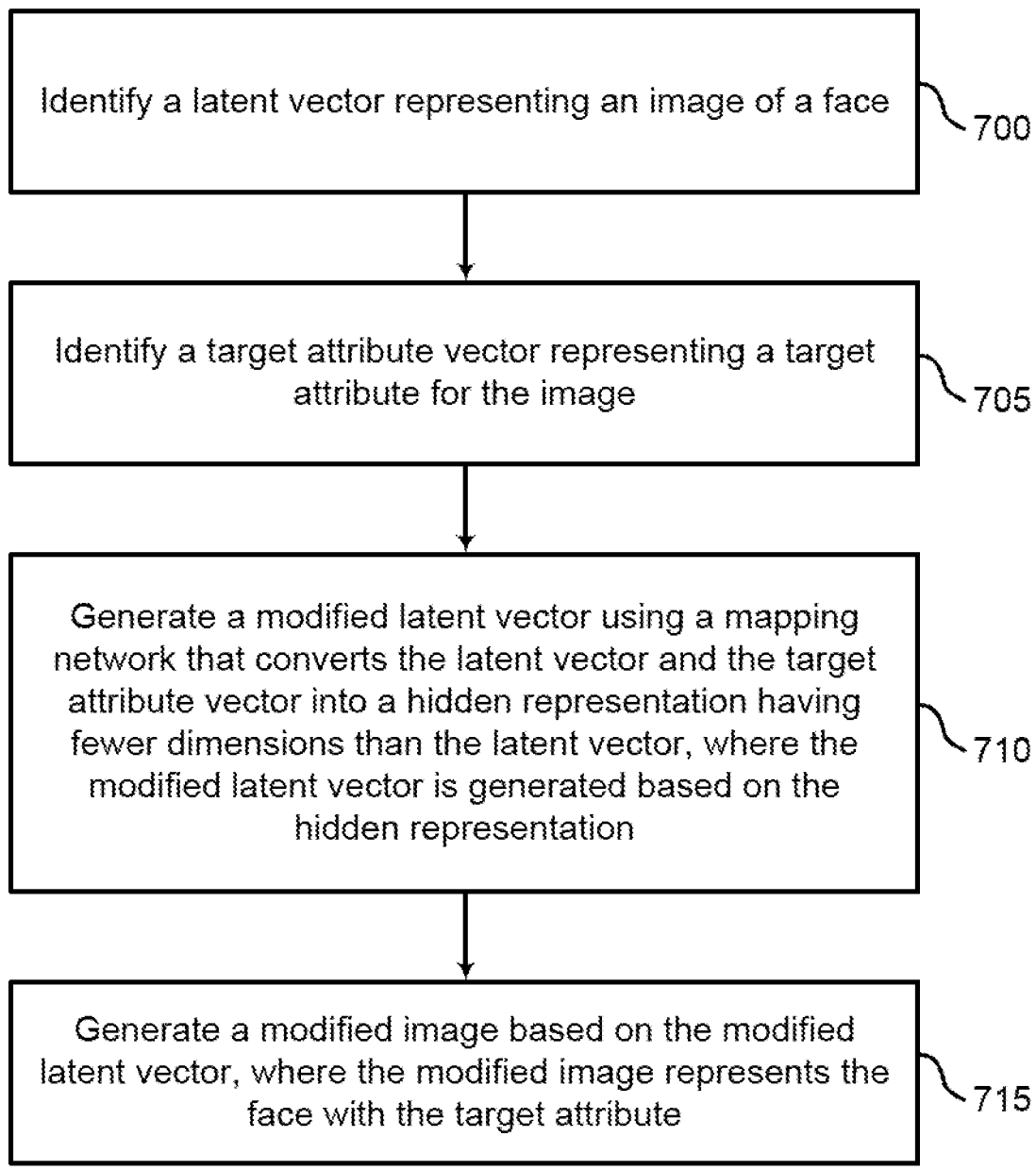
FIG. 7 shows an example of a process for image processing according to aspects of the present disclosure.
Figure 8:
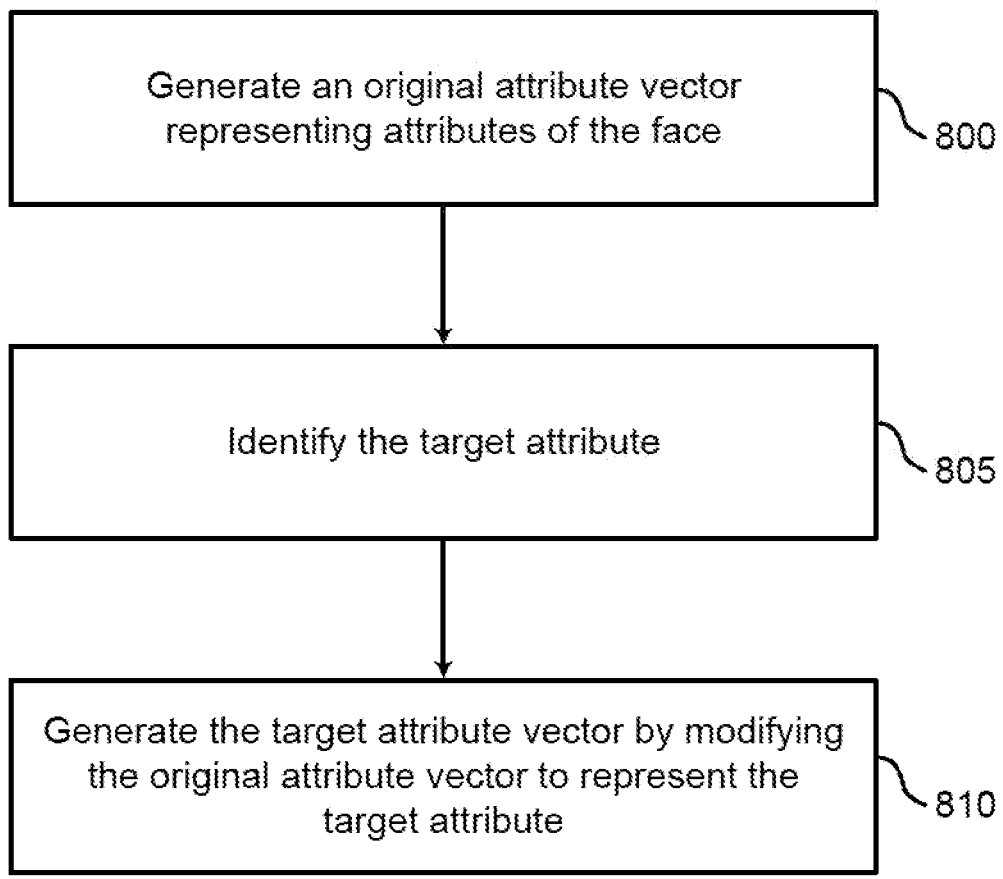
FIG. 8 shows an example of a process for generating a target attribute vector according to aspects of the present disclosure.

In accordance with FIGS. 7-8, a method, apparatus, and non-transitory computer readable medium for image processing are described. One or more embodiments of the method, apparatus, and non-transitory computer readable medium include identifying a latent vector representing an image of a face, identifying a target attribute vector representing a target attribute for the image, generating a modified latent vector using a mapping network that converts the latent vector and the target attribute vector into a hidden representation having fewer dimensions than the latent vector, wherein the modified latent vector is generated based on the hidden representation, and generating a modified image based on the modified latent vector, wherein the modified image represents the face with the target attribute.

Some examples of the method, apparatus, and non-transitory computer readable medium described above further include receiving user input indicating the target attribute. Some examples further include generating the target attribute vector based on the user input.

Some examples of the method, apparatus, and non-transitory computer readable medium described above further include generating an original attribute vector representing attributes of the face. Some examples further include identifying the target attribute. Some examples further include generating the target attribute vector by modifying the original attribute vector to represent the target attribute.

Some examples of the method, apparatus, and non-transitory computer readable medium described above further include generating a low-resolution image by down-scaling the image, wherein the original attribute vector is generated based on the low-resolution image.

Some examples of the method, apparatus, and non-transitory computer readable medium described above further include receiving attribute information from a user interface. Some examples further include generating the target attribute vector based on the attribute information. In some examples, the latent vector is generated using a generator network inversion. In some examples, the image is generated based on the latent vector.

FIG. 7 shows an example of a process for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 700, the system identifies a latent vector representing an image of a face. In some cases, the operations of this step refer to, or may be performed by, an image processing network as described with reference to FIG. 4.

In some embodiments, the image processing network takes the latent encoding of a face and desired attribute changes as input and outputs the latent space encoding of the edited image. In some examples, the mapping network is trained offline using unsupervised data, with training labels generated by an off-the-shelf attribute classifier. The desired attribute changes and conservation laws (e.g., identity maintenance) are encoded in the training loss. The number of attributes the mapper can simultaneously modify is determined by the attributes available to the classifier. In some examples, the image processing network can be trained to handle 35 attributes. Real-time attribute editing is performed because no optimization is performed at deployment or inference time. Therefore, computation time is negligible. The image processing network is configured to conserve the identity of the face and restricts changes to unwanted attributes.

Network models based on latent space manipulation rely on StyleGAN-related model to generate the images, i.e., the original image (i.e., input image to the system) is also GAN-generated. In some embodiments, the image processing network initially locates a latent space vector that faithfully reconstructs a real-world image (i.e., known as GAN inversion). The latent vector is generated using a generator network inversion.

At operation 705, the system identifies a target attribute vector representing a target attribute for the image. In some cases, the operations of this step refer to, or may be performed by, a target attribute component as described with reference to FIGS. 4 and 5. The target attribute vector and the latent vector are input to the mapping network to produce a modified latent vector.

At operation 710, the system generates a modified latent vector using a mapping network that converts the latent vector and the target attribute vector into a hidden representation having fewer dimensions than the latent vector, where the modified latent vector is generated based on the hidden representation. In some cases, the operations of this step refer to, or may be performed by, a mapping network as described with reference to FIGS. 4, 5, and 9.

In some embodiments, the system identifies latent encoding corresponding to the image with one or more changed attributes. A trained neural network (i.e., the mapping network) performs non-linear latent-to-latent transformations. The image processing system can adapt to the latent spaces of off-the-shelf generator architectures by training the network end-to-end over the full generation pipeline. Conservation properties, such as maintaining the identity of the person are encoded in the form of training losses. A trained latent-to-latent mapping network is used for arbitrary images without retraining each time. The attributes or attribute changes based on user request are forward propagated through two fully connected layers of the latent-to-latent mapping network. The modified latent vector is then input to a generator (i.e., the generator network) to produce a modified image incorporating the attribute changes.

At operation 715, the system generates a modified image based on the modified latent vector, where the modified image represents the face with the target attribute. In some cases, the operations of this step refer to, or may be performed by, a generator network as described with reference to FIGS. 4, 5, and 9.

In some embodiments, the system performs attribute-based editing of an image (e.g., a digital image including a human face). The image processing network generates a modified picture (i.e., output image) based on an image of a person where one or more specific attributes (e.g., age or facial expression) are changed or adjusted according to user request. The change is implemented such that other attributes are kept close to their original values which provides the user with a maximum creative control. For example, the presence of the eyeglasses is to be conceived as an independently controllable attribute and the system would not add eyeglasses when making a human face looks older. Furthermore, the person in the modified image is recognizably as the same person in the original image, even if one or more attributes are modified according to user request.

FIG. 8 shows an example of a process for generating a target attribute vector according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 800, the system generates an original attribute vector representing attributes of the face. In some cases, the operations of this step refer to, or may be performed by, an image processing network as described with reference to FIG. 4.

At operation 805, the system identifies the target attribute. In some cases, the operations of this step refer to, or may be performed by, a user interface implemented on a user device as described with reference to FIG. 1.

In an embodiment, the number of attributes that can be manipulated in the system is determined by the capacity to generate training data through identifying attributes in a set of images. The image processing network generates faces with any attribute for which there is a recognizer. In some examples, the latent-to-latent mapping network is trained to generate 35 different attributes.

At operation 810, the system generates the target attribute vector by modifying the original attribute vector to represent the target attribute. In some cases, the operations of this step refer to, or may be performed by, a target attribute component as described with reference to FIGS. 4 and 5. In an embodiment, the target attribute vector and the original latent vector are input to the mapping network. The mapping network performs transformations of latent vectors that correspond to changes in specific attributes such that latent space edits are applied in face attribute editing.

Training and Evaluation

In accordance with FIGS. 9-13, a method, apparatus, and non-transitory computer readable medium for training a neural network are described. One or more embodiments of the method, apparatus, and non-transitory computer readable medium include identifying a training set comprising an image of a face, a latent vector representing the image, and a target attribute vector representing a target attribute for the face, computing a modified latent vector based on the latent vector and the target attribute vector by performing a non-linear transformation of the latent vector using a mapping network, generating a modified image based on the modified latent vector, wherein the modified image represents the face with the target attribute, generating a modified target attribute vector based on the modified image, computing a target attribute loss by comparing the target attribute vector with the modified target attribute vector, and training the mapping network based on the target attribute loss.

Some examples of the method, apparatus, and non-transitory computer readable medium described above further include identifying an original attribute vector for the image. Some examples further include computing a cycle latent vector based on the modified latent vector and the original attribute vector using the mapping network. Some examples further include computing a cycle loss by comparing the cycle latent vector with the latent vector, wherein the mapping network is trained based on the cycle loss.

Some examples of the method, apparatus, and non-transitory computer readable medium described above further include identifying an original attribute vector for the image. Some examples further include computing an identity latent vector based on the latent vector and the original attribute vector using the mapping network. Some examples further include computing an identity loss by comparing the identity latent vector with the latent vector, wherein the mapping network is trained based on the identity loss.

Some examples of the method, apparatus, and non-transitory computer readable medium described above further include computing a neighborhood loss by comparing the modified latent vector with the latent vector, wherein the mapping network is trained based on the neighborhood loss.

Some examples of the method, apparatus, and non-transitory computer readable medium described above further include extracting facial recognition features from the image. Some examples further include extracting modified facial recognition features from the modified image. Some examples further include computing a face identity loss by comparing the facial recognition features with the modified facial recognition features, wherein the mapping network is trained based on the face identity loss.

Some examples of the method, apparatus, and non-transitory computer readable medium described above further include computing mutual information between attributes of the target attribute vector. Some examples further include computing a regulated attribute vector based on the target attribute vector and the mutual information, wherein the modified latent vector is generated based on the regulated attribute vector.

Figure 9:
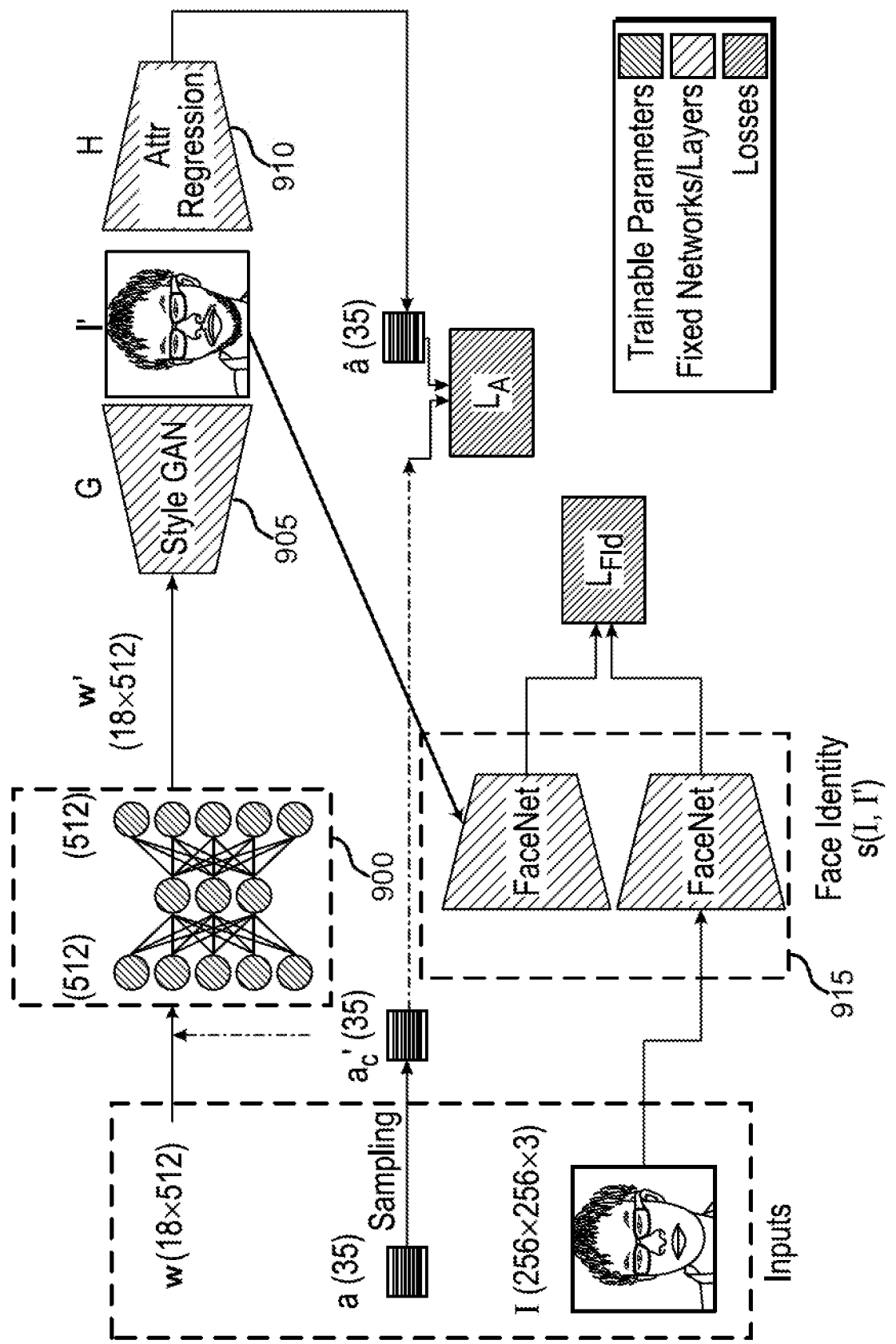
FIG. 9 shows an example of an image processing network trained based on a target attribute loss and a face identity loss according to aspects of the present disclosure.

FIG. 9 shows an example of an image processing network trained based on a target attribute loss and a face identity loss according to aspects of the present disclosure. The example shown includes mapping network 900, generator network 905, attribute regression network 910, and facial recognition network 915.

In some cases, an image of a human face I is generated by a StyleGAN-type generator $\mathcal{G}$ from a latent vector w from latent space $W_P$. The generator $\mathcal{G}$ is also referred to as a generator network. This image may be a real-world photo, in which case a latent vector w was generated through a GAN inversion process (i.e., a generator network inversion). Additionally, a collection of attributes is associated with the image a={$a_1$, $a_2$, . . . , $a_N$}. It is assumed that each of these attributes $a_i$ takes a value from the interval [0, 1] and each attribute value represents properties such as gender, age, hair, facial hair, presence of eyeglasses or pose which are interpretable by a human user. The user, when given an image I, should be able to fill in the corresponding values of a. These attributes correspond to natural language concepts humans use when describing a face.

In an embodiment, a database includes $\mathcal{D}$ ={($I_i$, $a_i$)} of such image and attribute vector pairs. The database can be obtained either by manual labeling or by using algorithms (e.g., Microsoft® Face API or Microsoft® Azure Face). The database D is used for training an attribute regression network that estimates the attribute vector for an arbitrary image. The attribute regression network is a neural network. The attribute regression network can estimate a number of distinct attributes. The attribute regression network uses a ResNet50 architecture and output of the network is passed to a convolution layer and two fully connected layers. The attribute regression network is trained with supervised multi-class training. For example, the attribute regression network has N=35 different attributes where the number may be limited by the availability of the corresponding $\mathcal{D}$. Attribute regression network 910 is an example of, or includes aspects of, the corresponding element described with reference to FIG. 4.

In an embodiment, the existence of a different metric, the identity of the person represented in image I is considered. A function s(I, I')∈[0, 1] is defined to estimate whether the person would recognize the images I and I' as belonging to a same person. For example, due to evolutionary pressure for recognizing members in their social groups, human users are good at estimating this function (or estimate based on this function), even if many attributes are different between the images I and I'. Advanced face recognition algorithms can also estimate this function accurately.

In an embodiment, an image I with attribute vector a and the corresponding latent vector w is given. A user may input or specify a different attribute vector a', in response to which a corresponding image I' is generated such that $\mathcal{H}$ (I')=a'. An attribute edit Δa=a'−a is applied.

A latent-to-latent mapping is performed using a mapping network instead of editing in the image domain. In an embodiment, the mapping network is trained representing a parameterized function $f$(w, Δa, θ)→w' such that $\mathcal{H}$ ( $\mathcal{G}$ (w'))=a', where θ is a trainable parameter. The training data (used to train the mapping network) includes a collection of triplets $\mathcal{U}$ ={($I_i$, $w_i$, $a_i$)} of an image, the corresponding latent encoding and attributes. There are multiple ways the training dataset can be created (i.e., generate the image using $\mathcal{G}$ based on the latent vector and the attributes using $\mathcal{H}$ ). The training approach corresponds to a self-supervised training where no manual labeling is needed. Mapping network 900 is an example of, or includes aspects of, the corresponding element described with reference to FIGS. 4 and 5.

An alternative approach to create $\mathcal{U}$ is that the image processing network takes a collection of real-world images as input, identifies the latent vector using generator network inversion (GAN inversion), and the attributes either using $\mathcal{H}$ or by manual labeling. Generator network 905 is an example of, or includes aspects of, the corresponding element described with reference to FIGS. 4 and 5.

The training of the latent-to-latent network $f$ is described as follows. The latent-to-latent network $f$ is embedded into the image processing network. The image processing network generates a new image based on an attribute change request and estimates the new attributes, where losses are defined to train the latent-to-latent network $f$. As shown in FIG. 9, weights and/or parameters of the image processing network are frozen, except those weights in the latent-to-latent mapping network. Trainable parameters and fixed networks/layers are illustrated in FIG. 9 using distinctive pattern filling.

The training is performed through randomly generated tasks for the latent-to-latent mapping network (transformer) organized in batches. A triplet from $\mathcal{U}$ is sampled to create a task and a target attribute vector a' is randomly generated which changes a single attribute from the attribute vector. In some cases, changing one single attribute may create unfeasible attribute vectors (e.g., a bearded man with no facial hair). Therefore, the image processing network is configured to modify or correct the target attribute by adding a correction term obtained from the mutual information matrix leading to a corrected attribute vector $a'_c$. The input of the latent-to-latent network is: $\Delta a = a'_c - a$.

This input is forward propagated through the image processing network, and multiple loss terms are included for training the mapping network 900. These losses are then backpropagated into updating parameters and weights of the mapping network 900 (denoted as network $f$). In an embodiment, the mapping network 900 includes an input layer, a hidden layer, and an output layer. The hidden representation of the mapping network 900 has fewer dimensions than the latent vector. In some examples, the hidden representation of the mapping network 900 has fewer dimensions than the input latent vector and the output latent vector.

In an embodiment, the latent-to-latent mapping network 900 is a fully connected network. For example, the input and output layers are determined by the architecture of the StyleGAN2 generator. The input includes 18×512 entries for the w value concatenated with 35 values corresponding to the Δa entry (i.e., attribute information). The mapping network 900 uses two fully connected layers of 512 neurons each with a tanh activation function. The 35 input attributes are concatenated to the two hidden layers. The output from the mapping network 900 is of dimension 18×512 corresponding to the w' latent vector, which is subsequently fed into the generator network 905.

According to some embodiments, facial recognition network 915 is configured to extract facial recognition features from the image (i.e., the original input image). Facial recognition network 915 also extracts modified facial recognition features from the modified image. Facial recognition network 915 includes FaceNet model. The end-to-end training architecture provides additional loss terms based on user needs. For example, a pixel-wise loss term is added that measures the openness of eyes or identity loss by calculating the Euclidean distance between FaceNet features of the original image and the modified image. The image processing network is not dependent on the selective application of the changed latent vector to some style layers of the generator network.

Figure 10:
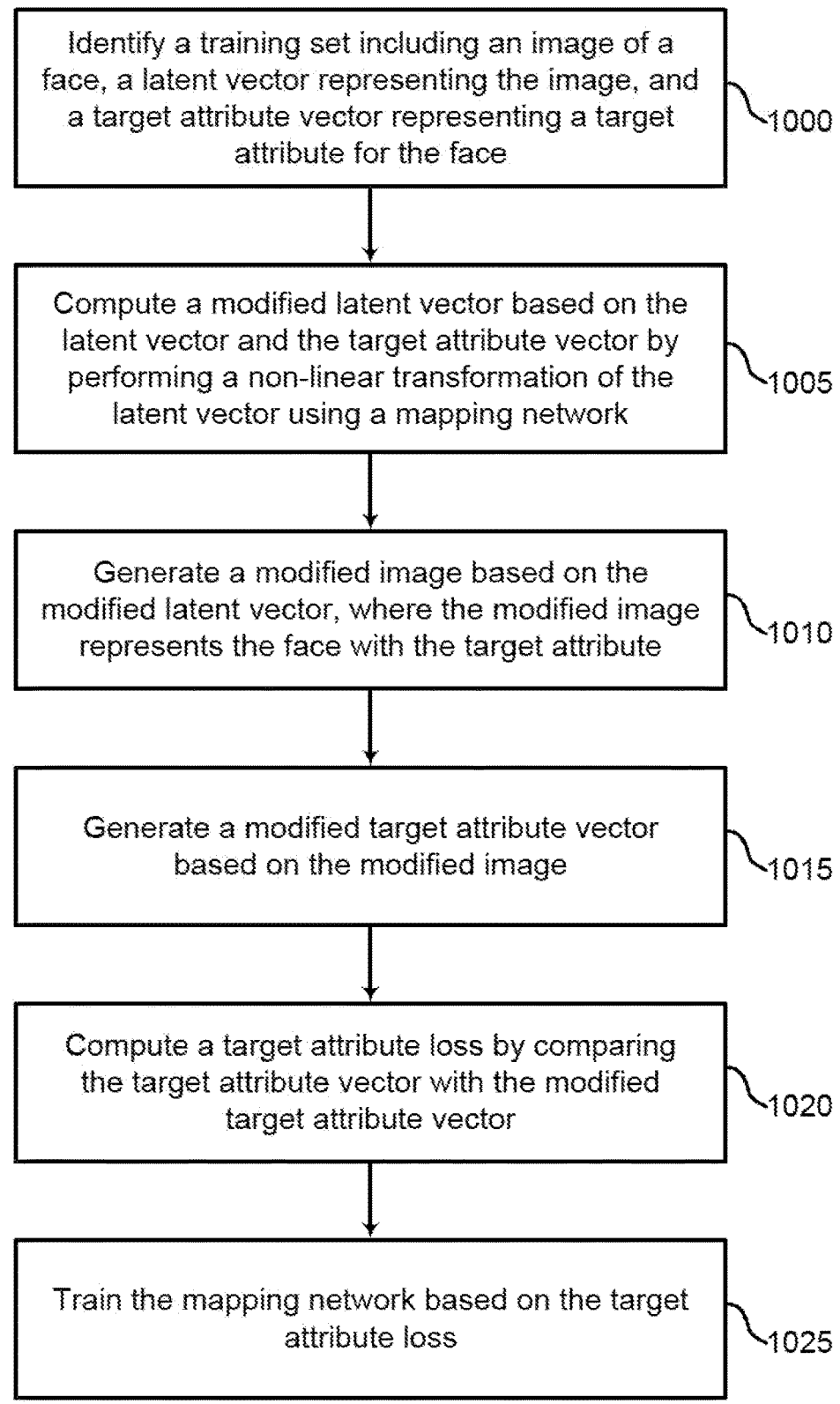
FIG. 10 shows an example of a process for training an image processing network according to aspects of the present disclosure.

FIG. 10 shows an example of a process for training an image processing network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

One or more embodiments of the present disclosure use supervised training techniques. Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Accordingly, during the training process, the parameters and weights of an image processing network are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

At operation 1000, the system identifies a training set including an image of a face, a latent vector representing the image, and a target attribute vector representing a target attribute for the face. In some cases, the operations of this step refer to, or may be performed by, a training component as described with reference to FIG. 4.

The system trains the latent-to-latent mapping network using multi-task loss functions. In some embodiments, a weighted sum of multiple loss terms is used (e.g., five loss terms). Each loss term represents a training requirement with respect to the behavior of the latent-to-latent transformation (i.e., training the mapping network of the image processing network).

At operation 1005, the system computes a modified latent vector based on the latent vector and the target attribute vector by performing a non-linear transformation of the latent vector using a mapping network. In some cases, the operations of this step refer to, or may be performed by, a mapping network as described with reference to FIGS. 4, 5, and 9.

At operation 1010, the system generates a modified image based on the modified latent vector, where the modified image represents the face with the target attribute. In some cases, the operations of this step refer to, or may be performed by, a generator network as described with reference to FIGS. 4, 5, and 9.

In an embodiment, a generator network is used to generate the modified image. The generator network includes StyleGAN, StyleGAN-v2, ProgressiveGAN, or other GAN models. For example, architectures such as StyleGAN and StyleGAN-v2 generate face images by successively applying different "styles" at various layers of a network model. These images are photorealistic such that an observer would mistake them for real photographs.

At operation 1015, the system generates a modified target attribute vector based on the modified image. In some cases, the operations of this step refer to, or may be performed by, an attribute regression network as described with reference to FIGS. 4 and 9.

In an embodiment, an attribute regression neural network is trained to estimate and generate an attribute vector for an arbitrary image. The attribute regression network includes at least ResNet50. Output from the ResNet50 is then passed to a convolution layer and two fully connected layers.

At operation 1020, the system computes a target attribute loss by comparing the target attribute vector with the modified target attribute vector. In some cases, the operations of this step refer to, or may be performed by, a training component as described with reference to FIG. 4.

In some examples, a supervised training model includes a loss function that compares predictions of the image processing network with ground truth training data. The term loss function refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are made during the next iteration.

In an embodiment, the target attribute loss term is used to determine whether the attributes of the generated image are close enough or similar to the corrected target attribute. In an example, the mean square error (MSE) is used between the output a and the corrected target value $a'_c$ because the behavior of the mean square error to penalize outlier values is useful.

$$\mathcal{L}_A = \|\hat{a} - a'_c\|^2 \tag{1}$$

The target attribute loss term is not limited to providing a penalty if the modified attributes are not achieved. For example, the target attribute loss term can indicate if there are changes in attributes that should not be changed by the image processing network.

In an embodiment, a final loss function used for training the mapping network includes a neighborhood loss term. As a result of the non-linearity and entangled nature of the latent space, relatively small attribute transformations may put the representation far from the initial location in latent space transformations. The attribute loss term penalizes changes in attributes that were not requested, therefore leaves open the possibility of one or more changes in the image that are not covered by the attributes (e.g., background, clothing, or illumination). The neighborhood loss term penalizes outputs that depart significantly from the original latent vector. The neighborhood loss term encourages the mapping network to achieve the attribute transformation with the minimum amount of departure from the original latent vector:

$$\mathcal{L}_N = \|w, f(w, \Delta a)\|^2 \tag{2}$$

At operation 1025, the system trains the mapping network based on the target attribute loss. In some cases, the operations of this step refer to, or may be performed by, a training component as described with reference to FIG. 4.

In an embodiment, the system includes the target attribute loss $\mathcal{L}_A$, a cycle loss $\mathcal{L}_C$, an identity loss $\mathcal{L}_I$, the neighborhood loss $\mathcal{L}_N$, a face identity loss $\mathcal{L}_{FId}$. The cycle loss, identity loss, and face identity loss are described with reference to FIGS. 11-13. The final loss function used in training the mapping network $f$ is a weighted sum of the loss terms mentioned above:

$$\mathcal{L}_{final} = \lambda_1 \cdot \mathcal{L}_A + \lambda_2 \cdot \mathcal{L}_C + \lambda_3 \cdot \mathcal{L}_I + \lambda_4 \cdot \mathcal{L}_N + \lambda_5 \cdot \mathcal{L}_{FId} \tag{3}$$

Figure 11:
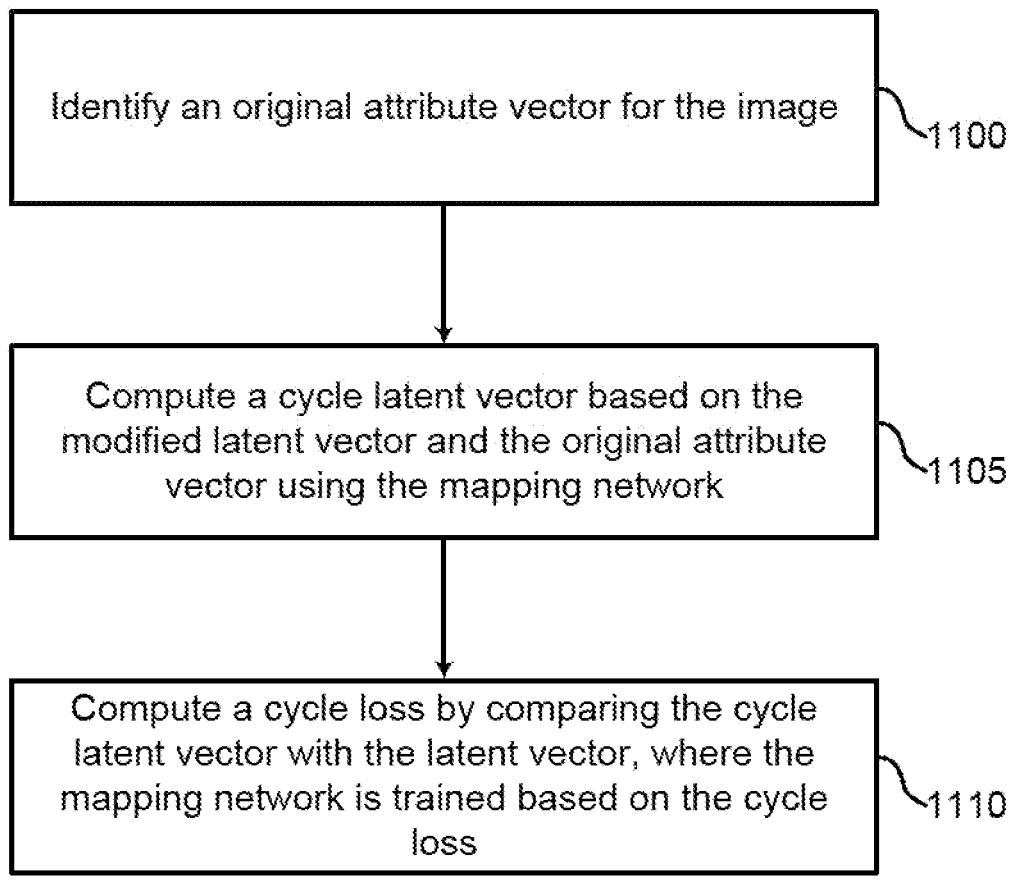
FIG. 11 shows an example of a process for training an image processing network based on a cycle loss according to aspects of the present disclosure.

FIG. 11 shows an example of a process for training an image processing network based on a cycle loss according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1100, the system identifies an original attribute vector for the image. In some cases, the operations of this step refer to, or may be performed by, a training component as described with reference to FIG. 4.

At operation 1105, the system computes a cycle latent vector based on the modified latent vector and the original attribute vector using the mapping network. In some cases, the operations of this step refer to, or may be performed by, a mapping network as described with reference to FIGS. 4, 5, and 9.

At operation 1110, the system computes a cycle loss by comparing the cycle latent vector with the latent vector, where the mapping network is trained based on the cycle loss. In some cases, the operations of this step refer to, or may be performed by, a training component as described with reference to FIG. 4.

In some cases, an attribute change for the same person should be reversible, i.e., increasing the age of a person with ten years and then decreasing the age by ten years should result in the same image. This is not automatically enforced by the target attribute loss, since other aspects of a picture not covered by a named attribute may also change (e.g., attributes other than the "age" attribute). The objective is implemented in the form of a cycle loss, as a distance between the original latent vector w and the latent vector obtained by applying two attribute changes with opposite signs. L1 distance is used for measuring distances in the latent space:

$$\mathcal{L}_c = \|w, f(f(w, \Delta a) - \Delta a)\| \tag{4}$$

Figure 12:
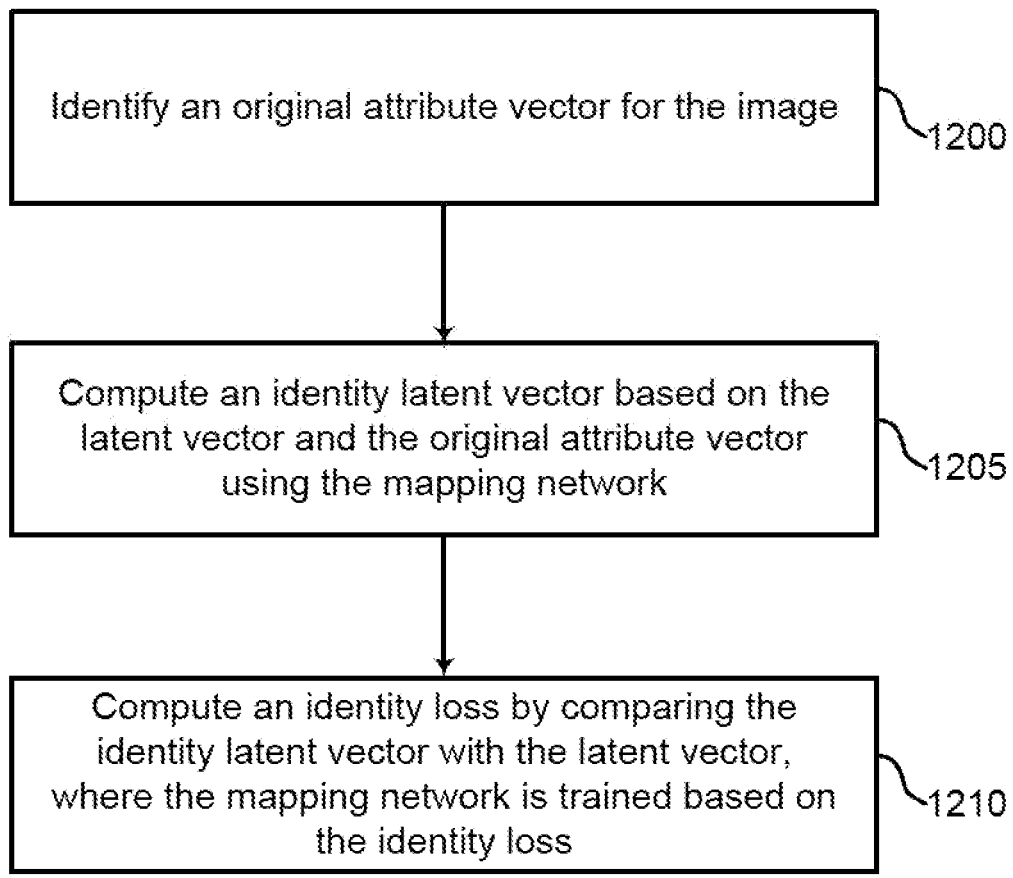
FIG. 12 shows an example of a process for training an image processing network based on an identity loss according to aspects of the present disclosure.

FIG. 12 shows an example of a process for training an image processing network based on an identity loss according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1200, the system identifies an original attribute vector for the image. In some cases, the operations of this step refer to, or may be performed by, a training component as described with reference to FIG. 4.

At operation 1205, the system computes an identity latent vector based on the latent vector and the original attribute vector using the mapping network. In some cases, the operations of this step refer to, or may be performed by, a mapping network as described with reference to FIGS. 4, 5, and 9.

At operation 1210, the system computes an identity loss by comparing the identity latent vector with the latent vector, where the mapping network is trained based on the identity loss. In some cases, the operations of this step refer to, or may be performed by, a training component as described with reference to FIG. 4.

In some embodiments, if no attribute change is requested in a latent-to-latent network (i.e., the mapping network), the mapping network maps the latent vector to itself. This is formulated as the following identity loss term:

$$\mathcal{L}_I = \|w, f(w, 0)\| \tag{5}$$

Figure 13:
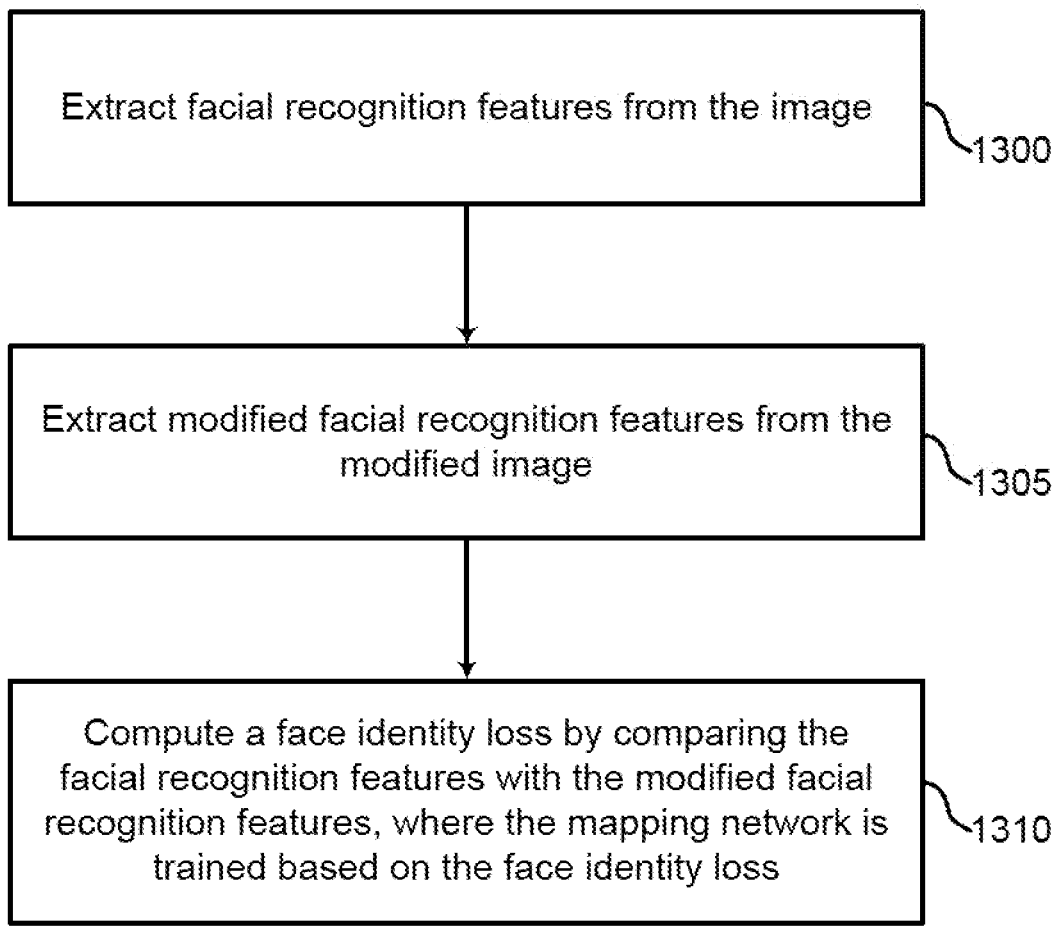
FIG. 13 shows an example of a process for training an image processing network based on a face identity loss according to aspects of the present disclosure.

FIG. 13 shows an example of a process for training an image processing network based on a face identity loss according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1300, the system extracts facial recognition features from the image. In some cases, the operations of this step refer to, or may be performed by, a facial recognition network as described with reference to FIG. 9.

At operation 1305, the system extracts modified facial recognition features from the modified image. In some cases, the operations of this step refer to, or may be performed by, a facial recognition network as described with reference to FIG. 9.

At operation 1310, the system computes a face identity loss by comparing the facial recognition features with the modified facial recognition features, where the mapping network is trained based on the face identity loss. In some cases, the operations of this step refer to, or may be performed by, a training component as described with reference to FIG. 4.

In some cases, the system is configured so that the transformation performed by the latent-to-latent mapping network (i.e., mapping network $f$) generates an image of a face that would be recognized as the same person as in an original image. This objective cannot be achieved in terms of the attributes. For example, human users can recognize faces despite significant changes in age, hair color or facial hair. A trained network for facial recognition, (e.g., FaceNet) is used to express this loss. For example, if the features extracted by FaceNet from an image are denoted as $\mathcal{F}(I)$, the face identity loss is formulated as follows:

$$\mathcal{L}_{FId} = \|\mathcal{F}(\mathcal{G}(w)), \mathcal{F}(\mathcal{G}(f(w,\Delta a)))\|^2 \quad (6)$$

Embodiments of the present disclosure include systems and methods for editing attributes of a facial image based on latent-to-latent transformation using a learned neural network (i.e., mapping network of the image processing network). The latent-to-latent mapping network of the image processing network is configured as a mutable part of the larger image processing network (having trainable weights or parameters). The image processing network also includes a generator network and an attribute regression network.

Performance of apparatus, systems and methods of the present disclosure have been evaluated, and results indicate embodiments of the present disclosure have obtained increased performance over existing technology. Example experiments demonstrate that the image processing network outperforms conventional systems.

Experiments and evaluation demonstrate that methods and systems of the present disclosure have increase performance in conserving the identity of a face (e.g., a digital image) and restricting changes to the requested attributes.

In some examples, the dataset for training the attribute regression network includes multiple different datasets of high-resolution face images (e.g., three datasets such as CelebAMask-HQ, FFHQ and a set of 400K images). These images are generated by sampling 400K vectors from the Z space of StyleGAN-v2 to find the corresponding w vectors.

In some examples, the vectors are truncated by a factor of 0.7 following the StyleGAN protocol to avoid producing out-of-distribution low-quality images. The attributes are extracted for the generated images using algorithms (e.g., Microsoft® Face API or Microsoft® Azure Face). The dataset for training is split in a 90:10 ratio which corresponds to 721,718 images for training and 72,172 images for testing.

Methods and systems of the present disclosure are compared with existing baseline models. The image processing network described herein is compared with InterFaceGAN, GANSpace and StyleFlow qualitatively and quantitatively on eight different attributes (i.e., age, baldness, beard, expression, gender, glasses, pitch, and yaw).

For comparison and evaluation, an entire range of face images is generated for each attribute $a_i$ and method $\mathcal{M}$ as described below. One experiment includes increasing and decreasing the target attribute step by step to generate new images and the experiment terminates when a generated image does not have any face in it. This is checked by running face detection convolutional neural network (i.e., multi-task cascaded convolutional neural network or MTCNN) on the generated images. As a result, an interval (m, M) is obtained such that $\mathcal{G}(\mathcal{M}(w, m-a_i))$ generates an image that has the smallest value and $\mathcal{G}(\mathcal{M}(w, M-a_i))$ generates an image that has the largest value for the target attribute $a_i$.

For example, 41 points are selected that are equally distanced in the interval and 41 images are generated from these points to cover the whole range of images that is generated when changing the target attribute. Existing codebases are extended to generate these images. One example experiment includes 50 images of faces sampled from the StyleFlow test set. Finally, 8×50×41=16400 images are generated.

Qualitive results based on some example experiments are recorded and evaluated. In one example, six different attributes are changed on six different faces to demonstrate the range of attribute changes on a variety of faces. The latent-to-latent mapping network is efficient in restricting the changes to an indicated attribute (e.g., user-specified request). Other attributes and features of the image not covered by the set of attributes (mentioned above) such as background, clothes and illumination remain the same. The conservation of attributes and image features is due to the training set-up and multi-task loss terms.

One example experiment compares the way in which a request to change the "age" attribute is handled by baseline models and the image processing apparatus described herein. For example, four models are compared that generate images corresponding to persons of the specified ages. The latent-to-latent mapping network changes exclusively the age attribute per user request. InterFaceGAN and StyleFlow also turn the hair white when generating an older person. This additional change in another attribute (i.e., hair color) may be desirable in practice, but a user working on facial editing may find this less useful, because there is a separate attribute controlling hair color. Conventional baseline algorithms also change the identity and gender of the person when the age attribute is changed.

One or more embodiments of the present disclosure include systems and methods that reduce unnecessary or unwanted changes in an image. In some examples, existing baseline models change the eyebrows, illumination and background of an image. In some baseline models, a change in an attribute may trigger inadvertent changes in other attributes. For example, if the attribute to be changed is "baldness", StyleFlow and GanSpace add glasses to the face when the baldness attribute moves in the negative direction. Unlike existing technology, the image processing apparatus described herein produces less extraneous changes.

In some examples, impact of the neighborhood and personal identity losses is illustrated when adding "beard" (attribute) to a person who does not have beard initially. The baseline models add beard to the person (e.g., GanSpace model adds beard and performs significant changes in the background). However, these baseline models change the person to female (i.e., gender attribute) when the attribute change is simply to remove the beard.

One or more embodiments of the present disclosure include systems and methods that increase or decrease facial expression (e.g., smile). While the network generates realistic looking smiles, the latent-to-latent mapping network does not alter clothing of the person or background.

Experiments and evaluation have been conducted to assess identity preservation performance by reporting the cosine distance between edited images feature vectors with original image feature vectors averaged over all test subjects. Euclidean distance may also be used to evaluate preserving identity. For example, MTCNN feature extractor is used that is different from FaceNet features used in training. The image processing network outperforms existing systems on 5 out of 8 target attributes. In some cases, the generated images are compared with or against multiple metrics such as Frechet Inception Distance (FID), Inception Score (IS), and Kernel Inception Distance (KID). For example, the metrics are evaluated by comparison against another dataset. One example includes generating 1000 images by FFHQ StyleGAN-v2 with truncation factor equal to 0.7. The image processing network has an increased performance and lower inception score difference than baselines in terms of metrics FID and KID. The inception score difference is smaller than 0.001 for all the methods.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:
1. A method for image processing, comprising:
identifying a latent vector representing an image of a face;
identifying a target attribute vector representing a target attribute for the image;
generating a modified latent vector using a mapping network that converts the latent vector and the target attribute vector into a hidden representation having fewer dimensions than the latent vector, wherein the modified latent vector is generated based on the hidden representation; and
generating a modified image based on the modified latent vector, wherein the modified image represents the face with the target attribute.

2. The method of claim 1, further comprising:
receiving user input indicating the target attribute; and
generating the target attribute vector based on the user input.

3. The method of claim 1, further comprising:
generating an original attribute vector representing attributes of the face;
identifying the target attribute; and
generating the target attribute vector by modifying the original attribute vector to represent the target attribute.

4. The method of claim 3, further comprising:
generating a low-resolution image by down-scaling the image, wherein the original attribute vector is generated based on the low-resolution image.

5. The method of claim 1, further comprising:
receiving attribute information from a user interface; and
generating the target attribute vector based on the attribute information.

6. The method of claim 1, wherein:
the latent vector is generated using a generator network inversion.

7. The method of claim 1, wherein:
the image is generated based on the latent vector.

8. An apparatus for image processing, comprising:
a target attribute component configured to generate a target attribute vector indicating a target attribute for an image of a face;
a mapping network configured to convert a latent vector representing the image and the target attribute vector indicating the target attribute for the face into a hidden representation having fewer dimensions than the latent vector, and to generate a modified latent vector based on the hidden representation; and
a generator network configured to generate a modified image based on the modified latent vector, wherein the modified image represents the face with the target attribute.

9. The apparatus of claim 8, wherein:
the mapping network comprises an input layer, an output layer, and a hidden layer, wherein the hidden layer has fewer dimensions than the input layer and fewer dimensions than the output layer.

10. The apparatus of claim 8, further comprising:
an attribute regression network configured to generate a modified target attribute vector based on the modified image.

11. The apparatus of claim 10, wherein:
the attribute regression network comprises a residual neural network, a convolution layer, and one or more fully connected layers.

12. The apparatus of claim 8, wherein:
the target attribute vector is produced using an inversion of the generator network.

13. The apparatus of claim 8, wherein:
the generator network comprises a generative adversarial network (GAN).

14. The apparatus of claim 8, further comprising:
a facial recognition network configured to extract facial recognition features of the modified image.

15. A method for training a neural network, comprising:
identifying a training set comprising an image of a face, a latent vector representing the image, and a target attribute vector representing a target attribute for the face;
computing a modified latent vector based on the latent vector and the target attribute vector by performing a non-linear transformation of the latent vector using a mapping network;
generating a modified image based on the modified latent vector, wherein the modified image represents the face with the target attribute;
generating a modified target attribute vector based on the modified image;
computing a target attribute loss by comparing the target attribute vector with the modified target attribute vector; and
training the mapping network based on the target attribute loss.

16. The method of claim 15, further comprising:
identifying an original attribute vector for the image;
computing a cycle latent vector based on the modified latent vector and the original attribute vector using the mapping network; and
computing a cycle loss by comparing the cycle latent vector with the latent vector, wherein the mapping network is trained based on the cycle loss.

17. The method of claim 15, further comprising:
identifying an original attribute vector for the image;
computing an identity latent vector based on the latent vector and the original attribute vector using the mapping network; and
computing an identity loss by comparing the identity latent vector with the latent vector, wherein the mapping network is trained based on the identity loss.

18. The method of claim 15, further comprising:
computing a neighborhood loss by comparing the modified latent vector with the latent vector, wherein the mapping network is trained based on the neighborhood loss.

19. The method of claim 15, further comprising:
extracting facial recognition features from the image;
extracting modified facial recognition features from the modified image; and
computing a face identity loss by comparing the facial recognition features with the modified facial recognition features, wherein the mapping network is trained based on the face identity loss.

20. The method of claim 15, further comprising:
computing mutual information between attributes of the target attribute vector; and
computing a regulated attribute vector based on the target attribute vector and the mutual information, wherein the modified latent vector is generated based on the regulated attribute vector.

* * * * *